US009626117B2

(12) United States Patent
Kono

(10) Patent No.: US 9,626,117 B2
(45) Date of Patent: Apr. 18, 2017

(54) COMPUTER SYSTEM AND MANAGEMENT METHOD FOR COMPUTER SYSTEM

(71) Applicant: HITACHI, LTD., Tokyo (JP)

(72) Inventor: Yasutaka Kono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/787,060

(22) PCT Filed: Jan. 9, 2014

(86) PCT No.: PCT/JP2014/050198
§ 371 (c)(1),
(2) Date: Oct. 26, 2015

(87) PCT Pub. No.: WO2015/104811
PCT Pub. Date: Jul. 16, 2015

(65) Prior Publication Data
US 2016/0124666 A1 May 5, 2016

(51) Int. Cl.
G06F 3/06 (2006.01)
G06F 9/50 (2006.01)

(52) U.S. Cl.
CPC .......... *G06F 3/0619* (2013.01); *G06F 3/0665* (2013.01); *G06F 3/0689* (2013.01); *G06F 9/5016* (2013.01); G06F 3/0605 (2013.01)

(58) Field of Classification Search
CPC .... G06F 3/0619; G06F 3/0689; G06F 3/0665; G06F 3/0605; G06F 9/5016
See application file for complete search history.

(56) References Cited

U.S. PATENT DOCUMENTS

2005/0021908 A1* 1/2005 Ohno .................... G06F 3/0605
711/114
2006/0010289 A1* 1/2006 Takeuchi .............. G06F 3/0605
711/114

(Continued)

FOREIGN PATENT DOCUMENTS

| JP | 2005-044199 A | 2/2005 |
| JP | 2007-233783 A | 9/2007 |
| JP | 2009-282626 A | 12/2009 |
| JP | 2010-257008 A | 11/2010 |
| JP | 2012-242909 A | 12/2012 |

*Primary Examiner* — Hiep Nguyen
(74) *Attorney, Agent, or Firm* — Volpe and Koenig, P.C.

(57) ABSTRACT

A computer system, having: a storage apparatus having: a storage volume constructed by a physical resource; a host computer having a storage volume assigned from the storage apparatus; management computers having: a first management computer configured to manage the storage apparatus; and a second management computer configured to manage the host computer, the second management computer including: first template information for identifying a change that occurs in the host configuration information; and management subject resource relationship information, the first management computer being configured to notify, before the management operation accompanying the configuration change is carried out for the storage apparatus, the second management computer of a change that occurs in the storage configuration information, the second management computer being configured to identify the change that occurs in the host configuration information based on the change that occurs in the storage configuration information notified by the first management computer.

15 Claims, 24 Drawing Sheets

(56) References Cited

U.S. PATENT DOCUMENTS

| | | | |
|---|---|---|---|
| 2007/0226328 A1 | 9/2007 | Kusama et al. | |
| 2009/0292789 A1* | 11/2009 | Nagai | G06F 3/0607 709/213 |
| 2010/0274984 A1 | 10/2010 | Inomata et al. | |
| 2012/0030442 A1* | 2/2012 | Nakanishi | G06F 3/0605 711/163 |
| 2012/0089797 A1* | 4/2012 | Shibayama | G06F 11/3419 711/162 |
| 2012/0215895 A1* | 8/2012 | Kono | G06F 12/0653 709/223 |
| 2012/0221729 A1* | 8/2012 | Hara | G06F 3/0605 709/226 |
| 2012/0296943 A1 | 11/2012 | Nagakura et al. | |
| 2013/0254500 A1* | 9/2013 | Nakajima | G06F 3/061 711/162 |
| 2014/0156815 A1* | 6/2014 | Kitahara | G06F 3/0605 709/221 |
| 2015/0113149 A1* | 4/2015 | Gan | G06F 17/30327 709/226 |
| 2015/0373111 A1* | 12/2015 | Fukui | G06F 3/0605 709/213 |
| 2015/0373119 A1* | 12/2015 | Kaneko | H04L 67/1097 709/219 |
| 2015/0378848 A1* | 12/2015 | Kaneko | G06F 11/20 714/19 |

* cited by examiner

4131 STORAGE INFORMATION TABLE

| STORAGE ID | NAME | TOTAL CAPACITY | TOTAL FREE CAPACITY |
|---|---|---|---|
| ST.1 | STORAGE 1 | 25 TB | 20 TB |
| ST.2 | STORAGE 2 | 5 TB | 4 TB |
| ST.3 | STORAGE 3 | 10 TB | 8 TB |
| ST.4 | STORAGE 4 | 10 TB | 8 TB |
| : | : | : | : |

Columns: 41310, 41311, 41312, 41313

Fig. 4

4132 PHYSICAL RESOURCE INFORMATION TABLE

| STORAGE ID | PHYSICAL RESOURCE ID | POOL ID | CAPACITY | MEDIA TYPE |
|---|---|---|---|---|
| ST.1 | DRIVE.1 | POOL.1 | 1 TB | SATA |
| ST.1 | DRIVE.2 | POOL.1 | 1 TB | SATA |
| : | : | : | : | : |
| ST.2 | DRIVE.1 | POOL.1 | 500 GB | SATA |
| ST.2 | DRIVE.2 | POOL.1 | 500 GB | SATA |
| ST.2 | DRIVE.3 | POOL.1 | 500 GB | SATA |
| ST.2 | DRIVE.4 | POOL.1 | 500 GB | SATA |
| ST.2 | DRIVE.5 | POOL.1 | 500 GB | SATA |
| ST.2 | DRIVE.6 | POOL.2 | 500 GB | SSD |
| ST.2 | DRIVE.7 | POOL.2 | 500 GB | SSD |
| : | : | : | : | : |

Columns: 41320, 41321, 41322, 41323, 41324

Fig. 5

4133 POOL INFORMATION TABLE

| STORAGE ID | POOL ID | CAPACITY | FREE CAPACITY |
|---|---|---|---|
| ST.1 | POOL.1 | 1 TB | 900 GB |
| ST.1 | POOL.2 | 2 TB | 1 TB |
| ST.2 | POOL.1 | 2 TB | 2 TB |
| ST.2 | POOL.2 | 1 TB | 800 GB |
| : | : | : | : |

Fig. 6

4134 LOGICAL VOLUME INFORMATION TABLE

| STORAGE ID | VOLUME ID | CAPACITY | POOL ID |
|---|---|---|---|
| ST.1 | LU.1 | 300 GB | POOL.1 |
| ST.1 | LU.2 | 200 GB | POOL.2 |
| : | : | : | : |
| ST.2 | LU.1 | 200 GB | POOL.1 |
| ST.2 | LU.2 | 300 GB | POOL.2 |
| : | : | : | : |

Fig. 7

4135 PORT INFORMATION TABLE

| STORAGE ID | PORT ID | NAME | PROTOCOL | WORLD WIDE NAME |
|---|---|---|---|---|
| ST.1 | PORT.1 | FC PORT 1 | FIBRE CHANNEL | FF.FF.FF.FF.FF.FF.01 |
| ST.1 | PORT.2 | FC PORT 2 | FIBRE CHANNEL | FF.FF.FF.FF.FF.FF.02 |
| ST.2 | PORT.1 | FC PORT 1 | FIBRE CHANNEL | FF.FF.FF.FF.FF.FF.03 |
| ST.2 | PORT.2 | FC PORT 2 | FIBRE CHANNEL | FF.FF.FF.FF.FF.FF.04 |
| : | : | : | : | : |

Fig. 8

4136 HOST INFORMATION TABLE

| HOST ID | IP ADDRESS | WWN | NAME | HOST TYPE |
|---|---|---|---|---|
| HOST.1 | 192.168.0.11 | 00.00.00.00.00.00.01 | PHYSICAL-1 | PHYSICAL SERVER |
| HOST.2 | 192.168.0.12 | 00.00.00.00.00.00.02 | HYPERVISOR-1 | HYPERVISOR |
| HOST.3 | 192.168.0.13 | 00.00.00.00.00.00.03 | HYPERVISOR-2 | HYPERVISOR |
| HOST.4 | 192.168.0.14 | NULL | VM-1 | VIRTUAL SERVER |
| HOST.5 | 192.168.0.15 | NULL | VM-2 | VIRTUAL SERVER |
| : | : | : | : | : |

Fig. 9

4137  HOST I/O PATH INFORMATION TABLE

| HOST ID | STORAGE ID | PORT ID | VOLUME ID | LUN |
|---|---|---|---|---|
| HOST.1 | ST.1 | PORT.1 | LU.1 | 1 |
| HOST.1 | ST.1 | PORT.1 | LU.2 | 2 |
| HOST.2 | ST.1 | PORT.2 | LU.3 | 3 |
| HOST.2 | ST.2 | PORT.1 | LU.1 | 1 |
| HOST.3 | ST.2 | PORT.2 | LU.2 | 2 |
| : | : | : | : | : |

Fig. 10

4141  STORAGE MANAGEMENT TASK TABLE

| TASK ID | EXECUTION DATE AND TIME | MANAGEMENT OPERATION NAME | PARAMETER NAME | PARAMETER VALUE |
|---|---|---|---|---|
| 1 | 2013/07/21 0:00 | LOGICAL VOLUME GENERATION | STORAGE ID | ST.1 |
| | | | POOL ID | POOL.1 |
| | | | VOLUME SIZE | 100 GB |
| | | | VOLUME ID | LU.100 |
| 2 | 2013/07/21 3:00 | LOGICAL VOLUME ASSIGNMENT | STORAGE ID | ST.1 |
| | | | VOLUME ID | LU.200 |
| | | | PORT ID | PORT.1 |
| | | | HOST ID | HOST.1 |
| | | | LUN | 200 |
| : | : | : | : | : |

Fig. 11

4142 INFORMATION-CHANGE-BY-STORAGE-MANAGEMENT-OPERATION TEMPLATE TABLE

| 41420 MANAGEMENT OPERATION NAME | 41421 CHANGED RESOURCE | 41422 CHANGE TYPE | 41423 CHANGE CONTENT |
|---|---|---|---|
| LOGICAL VOLUME GENERATION | POOL | ATTRIBUTE | [FREE CAPACITY] := [FREE CAPACITY] - "VOLUME SIZE" |
|  | LOGICAL VOLUME | INSTANCE | GENERATE ( [STORAGE ID] := "STORAGE ID", [VOLUME ID] := "VOLUME ID", [CAPACITY] := "VOLUME SIZE", [POOL ID] := "POOL ID") |
| LOGICAL VOLUME DELETION | POOL | ATTRIBUTE | [FREE CAPACITY] := [FREE CAPACITY] + "VOLUME ID".[CAPACITY] |
|  | LOGICAL VOLUME | INSTANCE | DELETE ( [STORAGE ID] = "STORAGE ID" AND [VOLUME ID] = "VOLUME ID") |
| LOGICAL VOLUME ASSIGNMENT | HOST I/O PATH | INSTANCE | GENERATE ( [HOST ID] := "HOST ID", [STORAGE ID] := "STORAGE ID", [PORT ID] := "PORT ID", [VOLUME ID] := "VOLUME ID", LUN := "LUN") |
| LOGICAL VOLUME FREEING | HOST I/O PATH | INSTANCE | DELETE ( [HOST ID] = "HOST ID" AND [STORAGE ID] = "STORAGE ID" AND [PORT ID] = "PORT ID" AND [VOLUME ID] = "VOLUME ID" AND [LUN] = "LUN") |
| : | : | : | : |

Fig. 12

6131 SERVER INFORMATION TABLE

| SERVER ID | ADDRESS | HOST NAME |
|---|---|---|
| SERVER.1 | 192.168.0.11 | PHYSICAL-1.HITACHI.COM |
| SERVER.2 | 192.168.0.12 | HYPERVISOR-1.HITACHI.COM |
| SERVER.3 | 192.168.0.13 | HYPERVISOR-2.HITACHI.COM |
| : | : | : |

6132 HBA INFORMATION TABLE

| HBA ID | WWN | NAME | SERVER ID |
|---|---|---|---|
| HBA.1 | 00.00.00.00.00.00.01 | HBA 1 | SERVER.1 |
| HBA.2 | 00.00.00.00.00.00.02 | HBA 2 | SERVER.2 |
| HBA.3 | 00.00.00.00.00.00.03 | HBA 3 | SERVER.3 |
| : | : | : | : |

6133 DISK INFORMATION TABLE

| SERVER ID | DISK ID | CAPACITY | HBA ID | TARGET PORT ID | LUN |
|---|---|---|---|---|---|
| SERVER.1 | DISK.1 | 300 GB | HBA.1 | TARGET PORT.1 | 1 |
| SERVER.1 | DISK.2 | 200 GB | HBA.1 | TARGET PORT.1 | 2 |
| SERVER.2 | DISK.1 | 500 GB | HBA.2 | TARGET PORT.2 | 3 |
| SERVER.2 | DISK.2 | 200 GB | HBA.2 | TARGET PORT3 | 1 |
| SERVER.3 | DISK.1 | 300 GB | HBA.3 | TARGET PORT.4 | 2 |
| SERVER.3 | DISK.2 | 100 GB | NULL | NULL | NULL |
| : | : | : | : | : | : |

Fig. 15

6134 TARGET PORT INFORMATION TABLE

| STORAGE ID | TARGET PORT ID | DISPLAY NAME | WWN | SUPPORTED PROTOCOL |
|---|---|---|---|---|
| ST.1 | TARGET PORT.1 | PORT 1 | FF.FF.FF.FF.FF.FF.01 | FIBRE CHANNEL |
| ST.1 | TARGET PORT.2 | PORT 2 | FF.FF.FF.FF.FF.FF.02 | FIBRE CHANNEL |
| ST.2 | TARGET PORT.1 | PORT 1 | FF.FF.FF.FF.FF.FF.03 | FIBRE CHANNEL |
| ST.2 | TARGET PORT.2 | PORT 2 | FF.FF.FF.FF.FF.FF.04 | FIBRE CHANNEL |
| : | : | : | : | : |

Fig. 16

7141 MANAGEMENT SUBJECT RESOURCE CORRESPONDENCE TABLE

| MANAGEMENT COMPUTER 1 | | | | MANAGEMENT COMPUTER 2 | | | |
|---|---|---|---|---|---|---|---|
| 71410 | 71411 | 71412 | 71413 | 71414 | 71415 | 71416 | 71416 |
| MANAGEMENT COMPUTER NAME | RESOURCE | ATTRIBUTE | KEY | MANAGEMENT COMPUTER NAME | RESOURCE | ATTRIBUTE | KEY |
| STORAGE MANAGEMENT COMPUTER | HOST | NAME | | HOST MANAGEMENT COMPUTER | SERVER | HOST NAME | |
| | | IP ADDRESS | 1 | | | ADDRESS | 1 |
| | | WWN | 2 | | HBA | WWN | 2 |
| STORAGE MANAGEMENT COMPUTER | PORT | NAME | | HOST MANAGEMENT COMPUTER | TARGET PORT | DISPLAY NAME | |
| | | PROTOCOL | | | | SUPPORTED PROTOCOL | |
| | | WORLD WIDE NAME | 1 | | | WWN | 1 |
| .. | | | .. | .. | | | .. |

Fig. 18

| | | |
|---|---|---|
| 71420 | MANAGEMENT COMPUTER NAME | STORAGE MANAGEMENT COMPUTER | .. |
| 71421 | MANAGEMENT OPERATION NAME | LOGICAL VOLUME ASSIGNMENT | .. |
| 71422 | NAME OF MANAGEMENT COMPUTER TO BE CHANGED | HOST MANAGEMENT COMPUTER | .. |
| 71423 | CHANGED RESOURCE | DISK | .. |
| 71424 | CHANGE TYPE | INSTANCE | .. |
| 71425 | CHANGE CONTENT | GENERATE (<br>[SERVER ID] := LINK (<br>SERVER INFORMATION TABLE,<br>HOST INFORMATION TABLE,<br>HOST INFORMATION TABLE.[HOST ID] = "HOST ID",<br>SERVER INFORMATION TABLE.[SERVER ID]),<br>[DISK ID] := GENERATE_ID(),<br>[CAPACITY] := LOGICAL VOLUME INFORMATION TABLE.[CAPACITY]<br>WHERE LOGICAL VOLUME INFORMATION TABLE.[VOLUME ID] = "VOLUME ID"<br>[HBA ID] := HBA INFORMATION TABLE.[HBA ID]<br>WHERE HBA INFORMATION TABLE.[SERVER ID] = LINK (<br>SERVER INFORMATION TABLE,<br>HOST INFORMATION TABLE,<br>HOST INFORMATION TABLE.[HOST ID] = "HOST ID",<br>SERVER INFORMATION TABLE.[SERVER ID]),<br>[TARGET PORT ID] := LINK (<br>TARGET PORT INFORMATION TABLE,<br>PORT INFORMATION TABLE,<br>PORT INFORMATION TABLE.[STORAGE ID] = "STORAGE ID"<br>AND PORT INFORMATION TABLE.[PORT ID] = "PORT ID",<br>TARGET PORT INFORMATION TABLE.[TARGET PORT ID]),<br>[LUN] := "LUN") | .. |

7142 INFORMATION-CHANGE-BY-MANAGEMENT-OPERATION TEMPLATE TABLE

Fig. 19

7142 INFORMATION-CHANGE-BY-MANAGEMENT-OPERATION TEMPLATE TABLE

| 71420 | 71421 | 71422 | 71423 | 71424 | 71425 |
|---|---|---|---|---|---|
| STORAGE MANAGEMENT COMPUTER | LOGICAL VOLUME FREEING | HOST MANAGEMENT COMPUTER | DISK | INSTANCE | DELETE ( [SERVER ID] = LINK ( SERVER INFORMATION TABLE, HOST INFORMATION TABLE, HOST INFORMATION TABLE.[HOST ID] = "HOST ID", SERVER INFORMATION TABLE.[SERVER ID]) AND [TARGET PORT ID] = LINK ( TARGET PORT INFORMATION TABLE, PORT INFORMATION TABLE, PORT INFORMATION TABLE.[STORAGE ID] = "STORAGE ID" AND PORT INFORMATION TABLE.[PORT ID] = "PORT ID", TARGET PORT INFORMATION TABLE.[TARGET PORT ID]) AND [LUN] = "LUN") |
| .. | .. | .. | .. | .. | .. |

Fig. 20

7137b HOST I/O PATH INFORMATION TABLE

| HOST ID | STORAGE ID | PORT ID | VOLUME ID | LUN | CHANGE FLAG | SCHEDULED CHANGE DATE AND TIME | MANAGEMENT COMPUTER NAME | TASK ID | CHANGE CONDITION |
|---|---|---|---|---|---|---|---|---|---|
| HOST.1 | ST.1 | PORT.1 | LU.1 | 1 | 000 | NULL | NULL | NULL | NULL |
| HOST.1 | ST.1 | PORT.1 | LU.2 | 2 | 000 | NULL | NULL | NULL | NULL |
| HOST.1 | ST.1 | PORT.2 | LU.3 | 3 | 000 | NULL | NULL | NULL | NULL |
| HOST.1 | ST.1 | PORT.2 | LU.4 | 4 | 100 | 2013/07/21 1:00 | STORAGE MANAGEMENT COMPUTER | 2 | FOR SUCCESS |
| HOST.2 | ST.2 | PORT.2 | LU.1 | 1 | 010 | 2013/07/21 2:00 | STORAGE MANAGEMENT COMPUTER | 3 | FOR SUCCESS |
| HOST.2 | ST.2 | PORT.1 | LU.2 | 1 | 010 | 2013/07/21 2:00 | STORAGE MANAGEMENT COMPUTER | 3 | FOR FAILURE |
| .. | .. | .. | .. | .. | .. | .. | .. | .. | .. |

Fig. 27

COMPUTER SYSTEM AND MANAGEMENT METHOD FOR COMPUTER SYSTEM

BACKGROUND

This invention relates to a configuration management for an IT system, and more particularly, to a technology for identifying a change in configuration information on the IT system held by a management software.

As the technology relating to the management of the IT system, JP 2012-242909 A is known. In JP 2012-242909 A, to attain an object to "enable detection of a possibility of an inconsistency in a database integrating a plurality of databases", there is disclosed a technology in which "a determination program controls a computer to carry out storing first information defining a dependency among types out of a plurality of types of components included in a system in storage means, acquiring relationship information representing a dependency among a plurality of components included in the system and type information representing respective types of the plurality of components from a plurality of databases storing the relationship information and the type information, generating, based on the acquired pieces of information, third information representing that respective types of a certain component and a component group have a dependency, and determining whether or not the generated third information matches the first information stored in the storage means."

SUMMARY

Through the use of the related art, in a configuration in which a computer system formed of storage apparatus, host computers, switches, and the like is managed by a plurality of types of management software, when pieces of configuration information held by the respective pieces of management software are integrated, a possible inconsistency of the integrated information can be detected by detecting the fact that information on a certain component is not acquired from a part of the pieces of the management software.

However, the related art does not consider, when an operation of setting change is carried out by a certain management software, what changes are to occur in configuration information on an apparatus to be managed by this management software and other management software. Therefore, there is a problem in that the consistency in the integrated configuration information cannot be guaranteed after the changes that occur in the future and are caused as a result of the operation are considered.

For example, it is assumed that, in a computer system in which a management computer A for managing a storage apparatus and a management computer B for managing the storage apparatus and a host computer mutually communicate configuration information, the management computer A carries out a management operation of changing a configuration of the storage apparatus. In the related-art example, after the management computer A changes the configuration of the storage apparatus, changed configuration information is notified to the management computer B.

Thus, while the management computer A is carrying out the management operation, when the management computer B uses the configuration information on the storage apparatus and the host computer, only the configuration information before the change in the configuration of the storage apparatus is available. As a result, there is a problem in that the management computer B carries out the management operation based on the configuration information inconsistent as the entire computer system.

A representative aspect of the present disclosure is as follows. A computer system, comprising: at least one storage apparatus comprising: at least one physical resource; and at least one storage volume constructed by the at least one physical resource; at least one host computer comprising at least one storage volume assigned from the at least one storage apparatus; and a management computer configured to manage the at least one storage apparatus and the at least one host computer, the management computer comprising: a first management computer configured to acquire storage configuration information including configuration information from the storage apparatus, to thereby manage the storage apparatus; a second management computer configured to acquire host configuration information including configuration information from the host computer, to thereby manage the host computer; and a third management computer configured to acquire the storage configuration information and the host configuration information respectively from the first management computer and the second management computer, to thereby manage the storage apparatus and the host computer, the third management computer including: first template information for identifying a change that occurs in the host configuration information acquired from the second management computer when the first management computer carries out a management operation accompanying a configuration change for the storage apparatus: and management subject resource relationship information representing a correspondence between the storage configuration information held by the first management computer and the host configuration information held by the second management computer, the first management computer being configured to notify, before the management operation accompanying the configuration change is carried out for the storage apparatus, the third management computer of a change that occurs in the storage configuration information as an execution result of the management operation, the third management computer being configured to identify a change that occurs in the host configuration information based on the change that occurs in the storage configuration information notified by the first management computer, the first template information, and the management subject resource relationship information representing the correspondence between the storage configuration information and the host configuration information.

According to the one embodiment of this invention, in the configuration in which the computer system including the storage apparatus and the host computers are managed by the first to third management computers, even while the operation of the setting change is being carried out by the first management computer, the computer system may be managed based on the configuration information consistent as a whole.

Further features relating to this invention are partially clearly described in the following description, partially become apparent from this description, or are learned by carrying out this invention. Aspects of this invention are attained and realized by components, combinations of various components, the following detailed description, and aspects of the appended claims.

It is necessary to understand that the preceding and following descriptions are provided for the sake of a typical description, and do not limit the claims and embodiments of this invention in any sense.

For example, the subject of the management of the management software is not limited to the storage apparatus, and may include, for example, a host computer, a switch, and an application program running on the host computer.

BRIEF DESCRIPTION OF THE DRAWINGS

FIG. 4 is a diagram for illustrating an example of a storage information table according to the first embodiment of this invention.

FIG. 5 is a diagram for illustrating an example of a physical resource information table according to the first embodiment of this invention.

FIG. 6 is a diagram for showing an example of the pool information table according to the first embodiment of this invention.

FIG. 7 is a diagram for showing an example of the logical volume information table according to the first embodiment of this invention.

FIG. 8 is a diagram for showing an example of the port information table according to the first embodiment of this invention.

FIG. 9 is a diagram for showing an example of the host information table according to the first embodiment of this invention.

FIG. 10 is a diagram for showing an example of the host I/O path information table according to the first embodiment of this invention.

FIG. 11 is a diagram for showing an example of the storage management task table according to the first embodiment of this invention.

FIG. 12 is a diagram for showing an example of the information-change-by-storage-management-operation template table according to the first embodiment of this invention.

FIG. 13 is a diagram for showing an example of the server information table according to the first embodiment of this invention.

FIG. 14 is a diagram for showing an example of the HBA information table according to the first embodiment of this invention.

FIG. 15 is a diagram for showing an example of the disk information table according to the first embodiment of this invention.

FIG. 16 is a diagram for showing an example of the target port information table according to the first embodiment of this invention.

FIG. 18 is a diagram for showing an example of the management subject resource correspondence table according to the first embodiment of this invention.

FIG. 19 is a diagram for illustrating an example of the information-change-by-management-operation template table according to the first embodiment of this invention.

FIG. 20 is a diagram for illustrating an example of the information-change-by-management-operation template table according to the first embodiment of this invention.

FIG. 27 is a host I/O path information table shown as an example of the table included in the integrated information table group according to a second embodiment of this invention.

DETAILED DESCRIPTION OF THE PREFERRED EMBODIMENTS

Now, referring to the accompanying drawings, a description is given of embodiments of this invention.

First Embodiment

Now, referring to the accompanying drawings, a description is given of the embodiments of this invention. In the accompanying drawings, components that are functionally the same are sometimes denoted by the same reference symbols. It should be noted that the accompanying drawings are illustrations of specific embodiments and implementation examples in conformity with the principle of this invention, but those are used for the understanding of this invention and never used to limit the interpretation of this invention.

In the embodiments of this invention, the description thereof is given in detail enough for a person skilled in the art to carry out this invention, but it is necessary to understand that other implementations and modes are possible and that changes in configurations and structures and substitutions of diverse components can be made without departing from the scope and spirit of the technical idea of this invention. Therefore, the following description should not be interpreted by limiting thereto.

In addition, as described later, the embodiments of this invention may be implemented by software running on a general purpose computer, by dedicated hardware, or by a combination of software and hardware.

It should be noted that in the following description, respective pieces of information of this invention are described in a "table" form, but those pieces of information do not necessarily need to be expressed by the data structure based on the table, and may be expressed by data structures such as a list, a database (DB), and a queue, or in other such form. For that reason, "table", "list", "DB", "queue", and the like are sometimes referred to simply as "information" in order to indicate independence of the data structure.

Further, the expressions "identification information", "identifier", "name", and "ID" can be used to describe contents of respective pieces of information, and those expressions can be substituted with one another.

In the following, when a description is given of each processing according to the embodiments of this invention by using a "program" as a subject (processing subject), the description may be given by using a processor as the subject because the program performs predetermined processing by being executed by the processor while using a memory and a communication port (communication control device). Further, the processing disclosed by using the program as the subject may also be processing performed by a computer, such as a management computer, or an information processing apparatus. A part or an entirety of the program may be realized by dedicated hardware or may be modularized. Different kinds of program may be installed into each computer through a program distribution server or a storage medium.

<Overview of this Invention>

Figure 1:
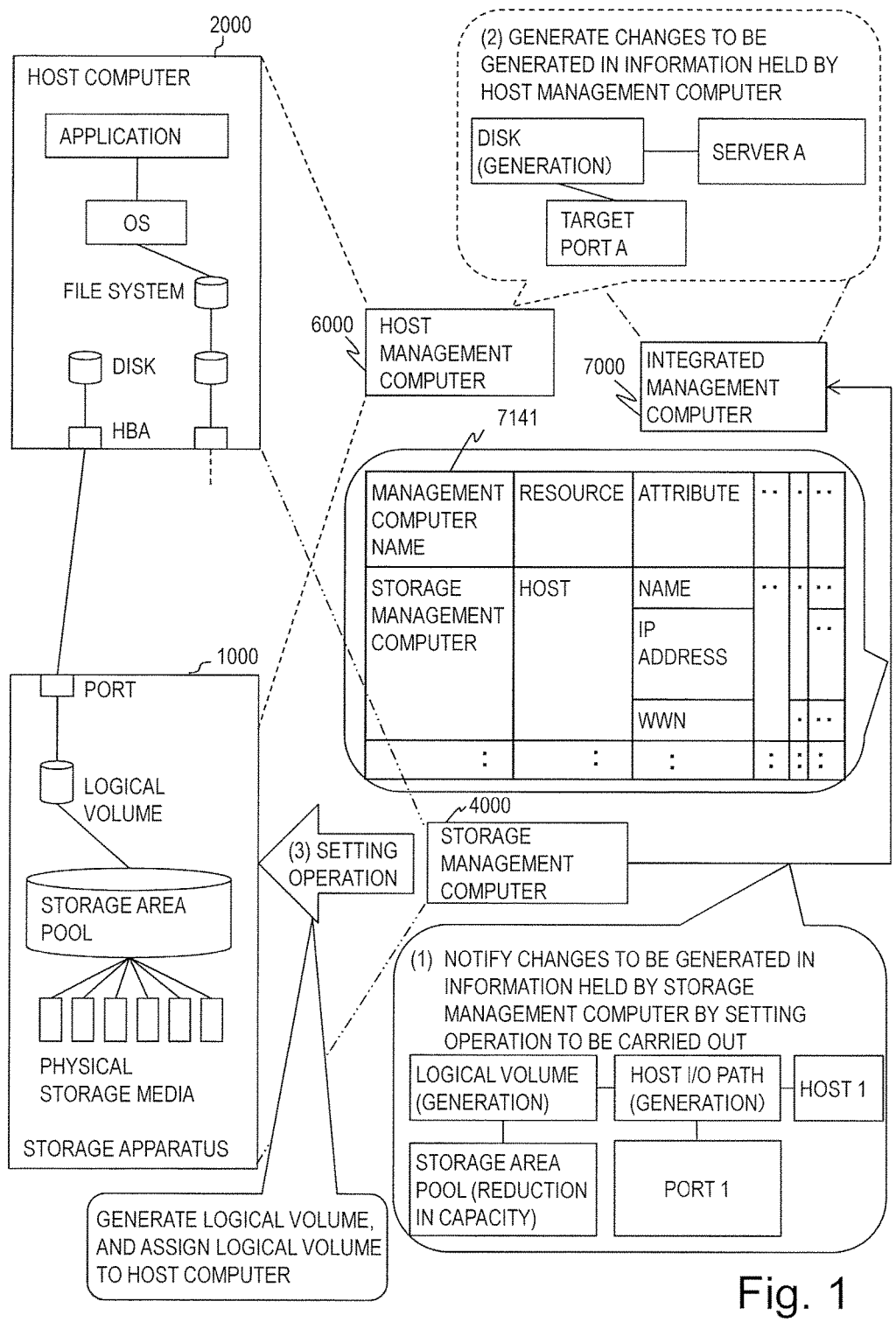
FIG. 1 is a block diagram for illustrating an example of a computer system according to a first embodiment of this invention.

Referring to a block diagram of FIG. 1, a description is now given of an overview of this invention. In the computer system of FIG. 1, one storage apparatus 1000 and one host computer 2000 are arranged, and a storage volume (logical volume) is assigned to the host computer 2000 from the storage apparatus 1000.

Moreover, the storage apparatus 1000 is managed by a storage management computer 4000, and the host computer 2000 is managed by a host management computer 6000. Moreover, an integrated management computer 7000 integrates and manages pieces of configuration information on the storage apparatus 1000 and the host computer 2000 respectively managed by the storage management computer 4000 and the host management computer 6000.

On this occasion, a case is considered in which the storage management computer 4000 carries out an operation to change a setting (such as an operation of generating a logical volume on the storage apparatus 1000 and assigning this logical volume to the host computer 2000) on the storage apparatus 1000.

In this case, the storage management computer 4000 identifies changes that occur in information on the storage apparatus 1000 managed by the storage management computer 4000 itself by the operation of the setting changes to be carried out, and notifies the integrated management computer 7000 of the identified changes ((1) of FIG. 1).

The integrated management computer 7000 generates changes that occur in the information on the host computer 2000 managed by the host management computer 6000 based on the notified information, templates for information changes caused by the operation of the setting change, and correspondences among pieces of information held by a plurality of pieces of management software, ((2) of FIG. 1)

Then, the storage management computer 4000 carries out the operation of the setting change directed to the storage apparatus 1000 ((3) of FIG. 1). During this operation, when the integrated management computer 7000 carries out a management operation based on information held by the storage management computer 4000 and the host management computer 6000 (such as display of configuration information from the storage apparatus 1000 to the host computer 2000), the integrated management computer 7000 carries out the management operation reflecting the changes to be caused by the operation of the setting change being carried out by the storage management computer 4000.

As a result, in the configuration in which the plurality of types of management software manage the computer system, even while any one of the types of the management software is carrying out the operation of the setting change, the computer system may be managed based on the information consistent as a whole.

It should be noted that the solution for the above-mentioned problem in the configuration including the storage management computer 4000, the host management computer 6000, and the integrated management computer 7000 has been described. However, the configuration is not limited to this example, and may additionally include, for example, a management computer for a switch apparatus. Moreover, for example, the storage management computer 4000 may be separated into a plurality of types of management computers such as a management computer for managing a configuration of the storage apparatus 1000 and a management computer for managing a performance thereof. Further, the integrated management computer 7000 may be omitted, and the storage management computer 4000 may give the above-mentioned notification to the host management computer 6000 so that the host management computer 6000 may generate the changes that occur in the information on the host computer 2000 managed by the host management computer 6000, or vice versa.

<A1. Configuration of System>

Figure 2:
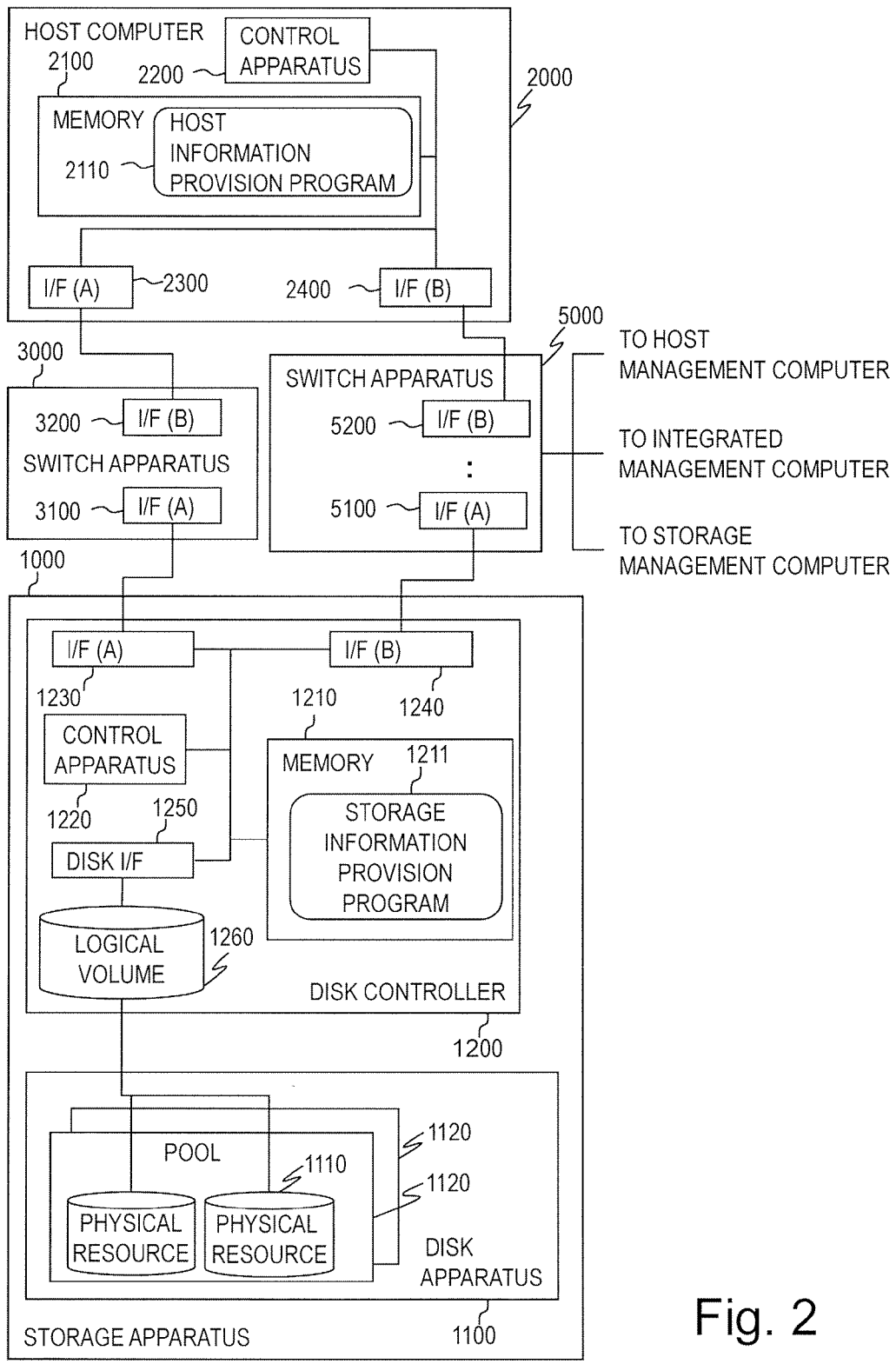
FIG. 2 is a first half of a block diagram for illustrating an example of a storage system according to the first embodiment of this invention.
Figure 3:
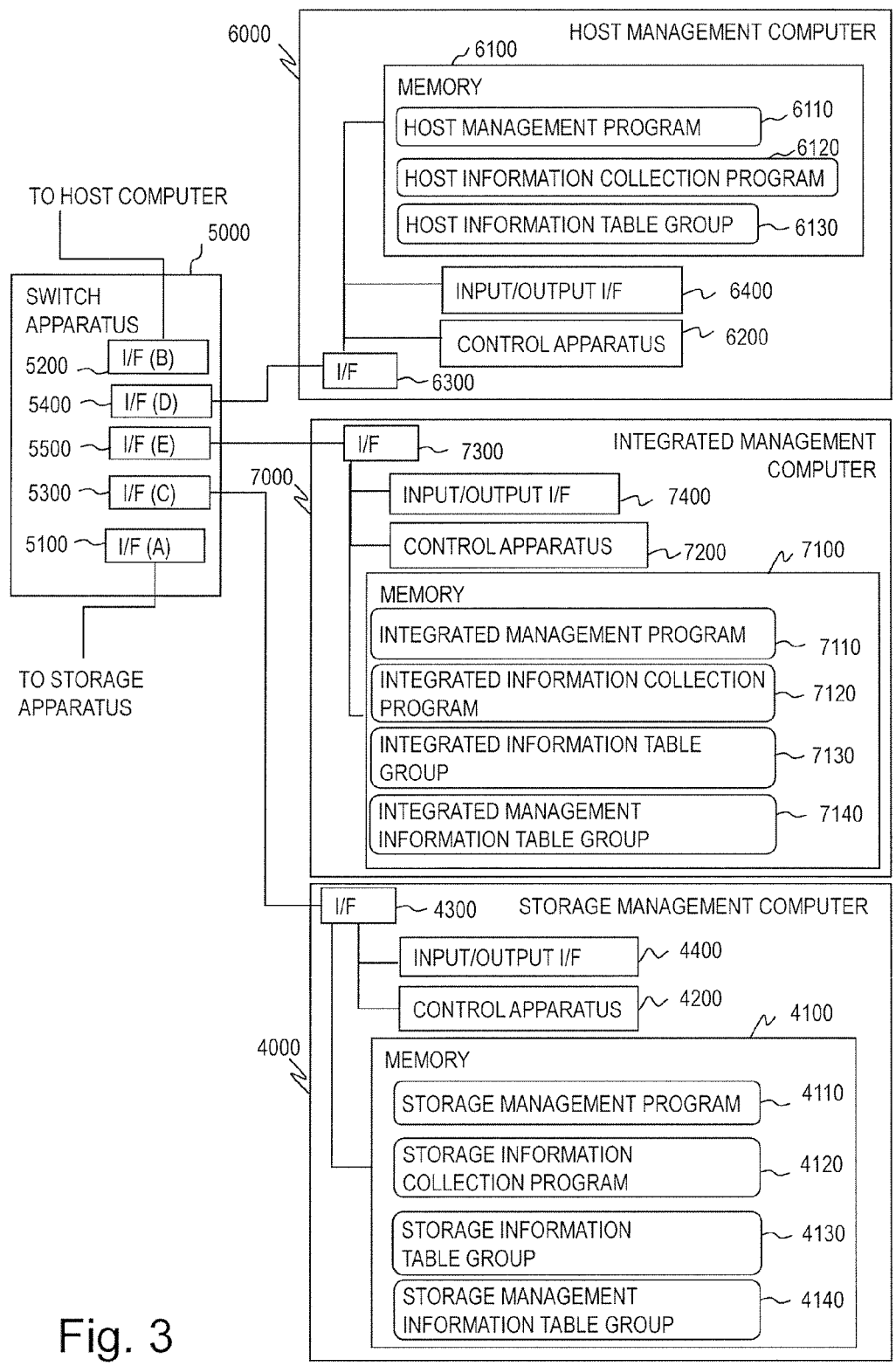
FIG. 3 is a second half of the block diagram for illustrating an example of the storage system according to a first embodiment of this invention.

FIG. 2 and FIG. 3 are block diagrams for illustrating the configuration of the computer system according to an embodiment of this invention. The computer system according to this embodiment includes the storage apparatus 1000, the host computer 2000, the switch apparatus 3000, the storage management computer 4000, the switch apparatus 5000, the host management computer 6000, and the integrated management computer 7000.

In the illustrated computer system, an example is described in which the number of each of the storage apparatus 1000, the host computers 2000, the switch apparatus 3000, the storage management computers 4000, the switch apparatus 5000, the host management computers 6000, and the integrated management computers 7000 is one, but the configuration is not limited to this example, and each number only needs to be at least one. Moreover, the storage management computer 4000, the host management computer 6000, and the integrated management computer 7000 may be the same computer.

The storage apparatus 1000 and the host computer 2000 are coupled to each other via the switch apparatus 3000 over a network. Moreover, the storage apparatus 1000, the host computer 2000, the storage management computer 4000, the host management computer, and the integrated management computer are coupled to one another via the switch apparatus 5000 over a network. It should be noted that the switch apparatus 3000 and the switch apparatus 5000 may be the same apparatus.

The storage apparatus 1000 includes a disk apparatus 1100 and a disk controller 1200.

The disk apparatus 1100 stores physical resources 1110 and pools 1120. On this occasion, the physical resource 1110 represents a resource in a storage volume provided by physical devices such as a hard disk drive (HDD) and a solid state drive (SSD).

Types of the physical devices for providing the physical resources 1110 are not particularly limited. The pool 1120 is a group of the physical resources 1110. On this occasion, the pool 1120 is constructed after the physical resources 1110 are made redundant by using a technology called "redundant array of independent disks (RAID)", but the pool 1120 is not limited to this configuration, and only needs to be at least one grouped physical resource 1110. In FIG. 2, two physical resources 1110 and two pools 1120 are stored in the disk apparatus 1100, but the configuration is not limited to this example, and at least one physical resource 1110 and at least one pool 1120 only need to be stored.

The disk controller 1200 includes a memory 1210, a control apparatus 1220, an interface (I/F) 1230 for coupling to the switch apparatus 3000, an I/F 1240 for coupling to the switch apparatus 5000, and a disk I/F 1250 for coupling to the disk apparatus 1100. Those components are coupled to one another via a bus or an interconnect.

The disk controller 1200 further includes a logical volume 1260. The logical volume 1260 represents a logical storage volume constructed by at least one physical resource and provided for the host computer 2000 by the disk controller 1200.

The memory 1210 stores programs executed by the control apparatus 1220 and data. In particular, the memory 1210 stores a storage information provision program 1211.

The storage information provision program 1211 is a program for collecting configuration information on the storage apparatus 1000, and transmitting this information to a computer executing other programs. The storage information provision program 1211 may additionally collect information on a performance and an operation state of the storage apparatus 1000, and transmit this information to a computer executing other programs.

The control apparatus 1220 includes a processor for controlling execution of the programs and inputs/outputs of the data in the memory 1210, and inputs/outputs of data and control commands via the respective I/Fs of the disk controller 1200.

The storage apparatus 1000 additionally has, for example, a function of constructing the pools 1120 from the physical resources 1110, a function of generating the logical volume 1260 from the pools 1120, a function of assigning the logical volume to the host computer 2000 via the I/F (A) 1230, and a function of receiving a request to change the configuration and the setting of the storage apparatus 1000 from the storage management computer 4000.

Moreover, the storage apparatus 1000 may additionally include an input apparatus to be used by an administrator (or a user) of the storage apparatus 1000 to input data, and an output apparatus for providing information to the administrator of the storage apparatus 1000, but those apparatus are not shown.

The host computer 2000 includes an I/F (A) 2300 for coupling the memory 2100 and the control apparatus 2200 to the switch apparatus 3000, and an I/F (B) 2400 for coupling the memory 2100 and the control apparatus 2200 to the switch apparatus 5000. Those components are coupled to one another via a bus or an interconnect. The memory 2100 stores programs and data used by the control apparatus 2200. In particular, the memory 2100 stores a host information provision program 2110.

The host information provision program 2110 is a program for collecting the configuration information on the host computer 2000, and transmitting this information to a computer executing other programs. The host information provision program 2110 may additionally collect information on the performance and the operation state of the host computer 2000, and transmit this information to a computer executing other programs.

The control apparatus 2200 includes a processor for controlling execution of the programs and inputs/outputs of the data in the memory 2100, and inputs/outputs of data and control commands via the I/F (A) 2300 and the I/F (B) 2400.

The host computer 2000 may additionally include an input apparatus to be used by an administrator of the host computer 2000 to input data, an output apparatus for providing information to the administrator of the host computer 2000, and a secondary storage apparatus for storing data, but those apparatus are not shown.

The switch apparatus 3000 includes an I/F (A) 3100 for coupling to the storage apparatus 1000, and an I/F (B) 3200 for coupling to the host computer 2000.

A network protocol used by the switch apparatus 3000 between the storage apparatus 1000 and the host computer 2000 includes the Fibre Channel (FC) and the Internet Small Computer System Interface (iSCSI), but is not particularly limited. Moreover, in FIG. 2, the example is illustrated in which the switch apparatus 3000 includes one I/F (A) 3100 and one I/F (B) 3200, but the configuration is not limited to this example, and only needs to include at least one I/F (A) 3100 and at least one I/F (B) 3200.

The storage management computer 4000 illustrated in FIG. 3 includes a memory 4100, a control apparatus 4200, and an I/F 4300 for coupling to the switch apparatus 5000, and an input/output I/F 4400 for coupling to an input/output apparatus (not shown).

The memory 4100 stores programs and data used by the control apparatus 4200. In particular, the memory 4100 stores a storage management program 4110, a storage information collection program 4120, a storage information table group 4130, and a storage management information table group 4140.

The storage management program 4110 is a program for managing the configuration of the storage apparatus 1000. The storage management program 4110 particularly has a function of collecting the configuration information on the storage apparatus 1000 via the storage information collection program 4120.

When the storage management program 4110 receives an instruction to register the storage apparatus 1000 for management, the storage management program 4110 calls the storage information collection program 4120 to collect the information on the storage apparatus 1000, and stores the information in the storage information table group 4130.

The storage management program 4110 additionally includes functions as the management computer, such as a function of constructing the pool 1120 from the physical resources 1110, a function of generating the logical volume 1260 from the pools 1120, a function of assigning the logical volume to the host computer 2000 via the I/F (A) 1230, and a scheduler function of carrying out specific processing at a specific time point.

Moreover, the storage management program 4110 includes a user interface for displaying the configuration information on the storage apparatus 1000, and carrying out a management operation directed to the storage apparatus 1000.

The storage information collection program 4120 is a program for collecting the configuration information on the storage apparatus 1000. The storage information collection program 4120 has a function of communicating to/from the storage information provision program 1211 operating on the storage apparatus 1000, to thereby acquire the information on the storage apparatus 1000.

The storage information table group 4130 is a set of tables for storing information on the storage apparatus 1000. In this embodiment, the storage information table group 4130 includes a storage information table 4131 (FIG. 4), a physical resource information table 4132 (FIG. 5), a pool information table 4133 (FIG. 6), a logical volume information table 4131 (FIG. 7), a port information table 4135 (FIG. 8), a host information table 4136 (FIG. 9), and a host I/O path information table 4137 (FIG. 10).

FIG. 4 is a diagram for showing an example of the storage information table. The storage information table 4131 is a table for storing the information on the storage apparatus 1000.

The storage information table 4131 includes a storage ID 41310 for identifying a storage apparatus 1000, a name 41311 of the storage apparatus 1000, a total capacity 41312 of pools 1120 provided by the storage apparatus 1000, and a total free capacity 41313 of the pools 1120 provided by the storage apparatus 1000 in one record. The storage information table 4131 may store not only the information shown in FIG. 4, but also other information on the storage apparatus 1000.

FIG. 5 is a diagram for showing an example of the physical resource information table. The physical resource information table 4132 is a table for storing information on the physical resources 1110 held by the storage apparatus 1000.

The physical resource table 4132 includes a storage ID 41320 for identifying a storage apparatus 1000, a physical resource ID 41321 for identifying a physical resource 1110, a pool ID 41322 for identifying a pool 1120 to which the physical resource 1110 is assigned, a capacity 41323 of the physical resource 1110, and a media type 41324 representing a type of a medium providing a storage volume of the physical resource 1110 in one record.

In FIG. 5, in the media type 41324, any one of the values, "SATA" and "SSD", is stored, but the values are not limited thereto, and information representing the type of the medium only needs to be stored. Moreover, the physical resource information table 4132 may store not only the information shown in FIG. 5, but also other information such as a performance of the physical resource 1110.

FIG. 6 is a diagram for showing an example of the pool information table. The pool information table 4133 is a table for storing information on the pools 1120 held by the storage apparatus 1000.

The pool information table 4133 includes a storage ID 41330 for identifying a storage apparatus 1000, a pool ID 41311 for identifying the pool 1120, a capacity 41332 of the pool 1120, and a free capacity 41333 of the pool 1120 in one record. The pool information table 4133 may store not only the information shown in FIG. 6, but also other information on the pool 1120.

FIG. 7 is a diagram for showing an example of the logical volume information table. The logical volume information table 4134 is a table for storing information on the logical volume 1260 provided by the storage apparatus 1000.

The logical volume information table 4134 includes a storage ID 41340 for identifying a storage apparatus 1000, a volume ID 41341 for identifying the logical volume 1260, a capacity 41342 of the logical volume 1260, and a pool ID 41343 for identifying the pool 1120 from which the logical volume 1260 is assigned, in one record. The logical information table 4134 may store not only the information shown in FIG. 7, but also other information on the logical volume 1260.

FIG. 8 is a diagram for showing an example of the port information table. The port information table 4135 is a table for storing information on the I/Fs (A) 1230 of the storage apparatus 1000. It should be noted that the I/F (A) 1230 is hereinafter also referred to as "port 1230".

The port information table 4135 includes a storage ID 41350 for identifying a storage apparatus 1000, a port ID 41351 for identifying a port 1230, a name 41352 of the port 1230, a protocol 41353 supported by the port 1230, and a world wide name (WWN) 41354 set to the port 1230 in one record. The port information table 4135 may store not only the information shown in FIG. 8, but also other information on the ports 1230.

FIG. 9 is a diagram for showing an example of the host information table. The host information table 4136 is a table for storing the information on the host computers 2000. The host information table 4136 includes a host ID 41360 for identifying a host computer 2000, an IP address 41361 assigned to the host computer 2000, a world wide name (WWN) 41362 assigned to the host computer 2000, a name 41363 of the host computer 2000, and a host type 41364 representing a type of the host computer 2000 in one record. The host information table 4136 may store not only the information shown in FIG. 9, but also other information on the host computers 2000.

FIG. 10 is a diagram for showing an example of the host I/O path information table. The host I/O path information table 4137 is a table for showing relationships each between a host computer 2000 and a logical volume 1260 assigned to the host computer 2000.

The host I/O path information table 4237 includes a host ID 41370 for identifying a host computer 2000, a storage ID 41371 for identifying a storage apparatus 1000, a port ID 41372 for identifying a port 1230, a volume ID 41373 for identifying a logical volume 1260, and a logical unit number (LUN) 41374 assigned to this I/O path in one record. The host I/O path information table 4137 may store not only the information shown in FIG. 10, but also other information on the relationships each between the host computer 2000 and the logical volume 1260 assigned to the host computer 2000.

A description has been given of the respective tables constructing the storage information table group 4130.

The storage management information table group 4140 is a set of the tables for storing management information used when the storage management program 4110 manages the configurations of the storage apparatus 1000. In this embodiment, the storage management information table group 4140 includes a storage management task table 4141 (FIG. 11) and an information-change-by-storage-management-operation template table 4142 (FIG. 12).

FIG. 11 is a table for showing an example of the storage management task table. The storage management task table 4141 is a table for storing information on management tasks (or management operations) carried out by the storage management program 4110.

The storage management task table 4141 includes a task ID 41410 for identifying a management task, an execution date and time 41411 of the management task, a management operation name 41412 representing a name of the management operation, a parameter name 41413 representing names of parameters of the management task, and a parameter value 41414 representing values of the parameters of the management task in one record.

In FIG. 11, the management operation name 41412 stores a management task described in a natural language, but the name is not limited to this example, and only needs to be information representing the management task. In FIG. 11, such a fact that a management task having a task ID "1" is executed at "2013/07/21 0:00", and the name of the management operation is "logical volume generation" is shown. The parameters of this management task include "storage ID" for identifying a storage apparatus 1000 subject to the generation of the logical volume, "pool ID" for identifying a pool 1120 from which the logical volume is assigned, "volume size" representing a capacity of the logical volume, and "volume ID" that is an identifier to be assigned to the logical volume. It should be noted that "null" may be stored as "volume ID". In this case, the storage management program 4110 automatically assigns a volume ID that is not used when the logical volume is generated. The storage management task table 4141 may store not only the information shown in FIG. 11, but also other information on the management task carried out by the storage management program 4110.

FIG. 12 is a diagram for showing an example of the information-change-by-storage-management-operation template table (second template information). The information-change-by-storage-management-operation template table 4142 is a table for storing information on templates formed from changes in the storage information table group 4130 each generated as a result of the storage management program 4110 carrying out a management task.

The information-change-by-storage-management-operation template table 4142 includes a management operation name 41420 representing a name of a management operation, a changed resource 41421 representing types of resources changed by a management task, a change type 41422 representing types of the change generated by the management task, and a change content 41423 representing contents of the change generated by the management task in one record.

It should be noted that information conforming to the following grammar is stored in the change content 41423 in this embodiment. Specifically, an element enclosed between symbols "[ ]" represents a name of an attributed set to a resource. Moreover, an element enclosed between symbols "" "" represents a name of a parameter of a management operation. Moreover, a symbol ":=" represents an assignment of a value, and a symbol "=" represents a comparison between values.

Referring to an example of FIG. 12, a specific description is now given. For example, from a row on which the management operation name 41420 is "logical volume generation", it is appreciated that the attribute of "pool" changes and an instance of "logical volume" is generated as a result of this management operation. The change in the attribute of the pool is an assignment of a value acquired by subtracting a capacity specified by the "volume size" parameter from the free capacity of the pool to a "free capacity" attribute of the pool (the free capacity 41333 of the pool information table 4133).

Moreover, in the instance (record to be stored in the logical volume information table 4134) of the logical volume to be generated, an ID specified by a "storage ID" parameter is stored in a storage ID 41340, an ID specified by a "volume ID" parameter is stored in a volume ID 41341, a capacity specified by a "volume size" parameter is stored in a capacity 41342, and an ID specified by a "pool ID" parameter is stored in a pool ID 41343.

Moreover, from a row on which the management operation name 41420 is "logical volume deletion" and the changed resource 41421 is "logical volume", it is appreciated that an instance of "logical volume" is deleted as a result of this management operation. The instance (a record stored in the logical volume information table 4134) of the logical volume to be deleted is a record including a storage ID 41340 matching an ID specified by a "storage ID" parameter and a volume ID 41341 matching an ID specified by a "volume ID" parameter.

The information-change-by-storage-management-operation template table 4142 may store not only the information shown in FIG. 12, but also other information on the templates formed from changes in the storage information table group 4130 each generated as a result of the storage management program 4110 carrying out a management task. For example, the information-change-by-storage-management-operation template table 4142 may store a template for an information change as a result of an operation of copying data stored in the logical volume 1260.

In this case, for example, the following information is stored: "logical volume copy generation" in the management operation name 41420; "inter-logical volume copy pair" in the changed resource 41421; "instance" in change type 41422; and "generate ([source storage ID]:="source storage ID", [source volume ID]:="source volume ID", [target storage ID]:="target storage ID", [target volume ID]:="target volume ID")" in the change content 41423.

A description has been given of the storage management information table group 4140.

The control apparatus 4200 of the storage management computer 4000 illustrated in FIG. 3 includes a processor for controlling the execution of the programs in the memory 4100, inputs/outputs of data via the input/output I/F 4400, and inputs/outputs of data and control commands via the I/F 4300.

The storage management computer 4000 may additionally include an input apparatus to be used by an administrator of the storage management computer 4000 to input data, an output apparatus for providing information to the administrator of the storage management computer 4000, and a secondary storage apparatus for storing data. Moreover, the various tables held by the storage management computer 4000 may be held on the secondary storage apparatus as well as on the memory.

It should be noted that the storage management computer 4000 and the storage apparatus 1000 are illustrated as independent apparatus in FIG. 2 and FIG. 3, but the configuration is not limited to this example, and the storage management computer 4000 may be stored in the same housing as that for the storage apparatus 1000. Moreover, the same functions as those of the storage management computer 4000 may be realized by storing the programs in the memory 4100 of the storage management computer 4000 in the memory 1210 of the storage apparatus 1000, and controlling the control apparatus 1220 to execute those programs. Further, the storage management computer 4000 may additionally include programs for managing the switch apparatus 3000 and the switch apparatus 5000.

The switch apparatus 5000 includes an I/F (A) 5100 for coupling to the storage apparatus 1000, an I/F (B) 5200 for coupling to the host computer 2000, an I/F (C) 5300 for coupling to the storage management computer 4000, an I/F (D) 5400 for coupling to the host management computer 6000, and an I/F (E) 5500 for coupling to the integrated management computer 7000.

Network protocols used among the storage apparatus 1000, the host computer 2000, the storage management computer 4000, the host management computer 6000, the integrated management computer 7000, and the switch apparatus 5000 for coupling those apparatus to one another include, for example, the TCP/IP, but are not particularly limited.

Moreover, in FIG. 3, one I/F (A) 5100, one I/F (B) 5200, one I/F (C) 5300, one I/F (D) 5400, and one I/F (E) 5500 are illustrated, but the number of I/Fs is limited to one, and only needs to be at least one.

The host management computer 6000 includes a memory 6100, a control apparatus 6200, an I/F 6300 for coupling to the switch apparatus 5000, and an input/output I/F 6400 for coupling to an input/output apparatus (not shown).

The memory 6100 stores programs and data used by the control apparatus 6200. In particular, the memory 6100 stores a host management program 6110, a host information collection program 6120, and a host information table group 6130.

The host management program 6110 is a program for managing configurations of host computers 2000. The host management program 6110 particularly has a function of collecting the configuration information on the host computers 2000 via the host information collection program 6120. When the host management program 6110 receives an instruction to register a host computer 2000 for management, the host management program 6110 calls the host information collection program 6120, to thereby collect the information on the host computer 2000, and stores the information in the host information table group 6130.

The host management program 6110 additionally includes functions as the management computer, such as a function of generating a file system on the logical volume 1260 (recognized as a disk on the host computer 2000) assigned to the host computer 2000 and a function of displaying the configuration information on the host computer 2000. Moreover, the host management program 6110 includes a user interface for displaying the configuration information on the host computer 2000, and carrying out a management operation directed to the host computer 2000.

The host information collection program 6120 is a program for collecting the configuration information on the host computers 2000. The host information collection program 6120 has a function of communicating to/from the host information provision program 2210 executed by the host computer 2000, to thereby acquire the information on the host computer 2000.

The host information table group 6130 is a set of tables for storing the information on the host computers 2000. In this embodiment, the host information table group 6130 includes a server information table 6131, an HBA information table 6132, a disk information table 6133, and a target port information table 6134.

FIG. 13 is a diagram for showing an example of the server information table. The server information table 6131 is a table for storing the information on the host computers 2000. It should be noted that herein, "server", "host computer", and "host" have the same meaning.

The server information table 6131 includes a server ID 61310 for identifying a host computer 2000, an address 61311 representing a network address assigned to the host computer 2000, and a host name 61312 assigned to the host computer 2000 in one record.

The server information table 6131 may store not only the information shown in FIG. 13, but also other information on the host computers 2000. For example, the server information table 6131 may store information on the memory 2100 and the control apparatus 2200 of the host computer 2000, and information on an operating system (OS) of the host computer 2000.

FIG. 14 is a diagram for showing an example of the HBA information table. The HBA information table 6132 is a table for storing information on the I/Fs (A) 2300 of the host computers 2000. It should be noted that the I/F (A) 2300 is hereinafter also referred to as "host bus adapter (HBA)".

The HBA information table 6132 includes an HBA ID 61320 for identifying an HBA 2300, a world wide name (WWN) 61321 assigned to the HBA 2300, a name 61322 of the HBA 2300, and a server ID 61323 for identifying a host computer 2000 including the HBA 2300 in one record. The HBA information table 6132 may store not only the information shown in FIG. 14, but also other information on the HBAs 2300.

FIG. 15 is a diagram for showing an example of the disk information table. The disk information table 6133 is a table for storing information on disks assigned to the host computers 2000.

The disk information table 6133 includes a server ID 61330 for identifying a host computer 2000, a disk ID 61331 for identifying a disk, a capacity 61332 of the disk, an HBA ID 61333 for identifying an HBA for issuing an I/O to a logical volume 1260 when an entity of the disk is the logical volume 1260 assigned from the storage apparatus 1000, a target port ID 61334 for identifying a port 1230 of the storage apparatus 1000 for receiving the I/O to the logical volume 1260, and an LUN 61335 for identifying an I/O path from the port 1230 to the logical volume in one record.

It should be noted that, for a disk constructed by a physical resource of the host computer 2000 itself, "null" is stored in each of the HBA ID 61333, the target ID 61334, and the LUN 61335. The disk information table 6133 may store not only the information shown in FIG. 15, but also other information on disks assigned to the host computers 2000.

FIG. 16 is a diagram for showing an example of the target port information table. The target port information table 6134 is a table for storing information on ports 1230 of the storage apparatus 1000 recognized by the host computers 2000.

Methods of recognizing, by the host computer 2000, the port 1230 of the storage apparatus 1000 includes, for example, a method of using the Inquiry command of the SCSI, but is not particularly limited.

The target port information table 6134 includes a storage ID 61340 for identifying a storage apparatus 1000, a target port ID 61341 for identifying a port 1230 of the storage apparatus 1000, a display name 61342 representing a name for display of the port 1230, a world wide name (WWN) 61343 assigned to the port 1230, and a supported protocol 61344 representing a protocol supported by the port 1230 in one record. The target port information table 6134 may store not only the information shown in FIG. 16, but also other information on the ports 1230.

A description has been given of the host information table group 6130.

The control apparatus 6200 of the host management computer 6000 illustrated in FIG. 3 includes a processor for controlling the execution of the programs in the memory 6100, inputs/outputs of data via the input/output I/F 6400, and inputs/outputs of data and control commands via the I/F 6300.

The host management computer 6000 may additionally include an input apparatus to be used by an administrator of the storage management computer 6000 to input data, an output apparatus for providing information to the administrator of the host management computer 6000, and a secondary storage apparatus for storing data. Moreover, the various tables held by the host management computer 6000 may be held on the secondary storage apparatus as well as on the memory.

It should be noted that the host management computer 6000 and the host computer 2000 are illustrated as independent apparatus in FIG. 2 and FIG. 3, but the configuration is not limited to this example, and the host management computer 6000 may be stored in the same housing as that for the host computer 2000. Moreover, the same functions as those of the host management computer 6000 may be realized by storing the programs in the memory 6100 of the host management computer 6000 in the memory 2100 of the host computer 2000, and controlling the control apparatus 2200 to execute those programs. Further, the host management computer 6000 may additionally include programs for managing the switch apparatus 3000 and the switch apparatus 5000.

The integrated management computer 7000 includes a memory 7100, a control apparatus 7200, an I/F 7300 for coupling to the switch apparatus 5000, and an input/output I/F 7400 for coupling to an input/output apparatus (not shown).

The memory 7100 stores programs and data used by the control apparatus 7200. In particular, the memory 7100 stores an integrated management program 7110, an integrated information collection program 7120, an integrated information table group 7130, and an integrated management information table group 7140.

The integrated management program 7110 is a program for managing the configurations of the storage apparatus 1000 and the host computer 2000. The integrated management program 7110 particularly has a function of collecting, via the integrated information collection program 7120, the information stored in the storage information table group 4130 held by the storage management computer 4000, and the information stored in the host information table group 6130 held by the host management computer 6000.

The integrated management program 7110 additionally includes, for example, a function of displaying the configuration information on the storage apparatus 1000 and the host computer 2000. Moreover, the integrated management program 7110 includes a user interface for displaying the configuration information on the storage apparatus 1000 and the host computer 2000, and carrying out management operations directed to the storage apparatus 1000 and the host computer 2000.

The integrated information collection program 7120 is a program for collecting the information stored in the storage information table group 4130 held by the storage management computer 4000, and the information stored in the host information table group 6130 held by the host management computer 6000.

The integrated information table group 7130 is a set of tables for storing the information on the storage apparatus 1000 and the host computers 2000 collected by the integrated information collection program 7120. In this embodiment, the integrated information table group 7130 includes the tables included in the storage information table group 4130 and the host information table group 6130. It should be noted that the tables included in the integrated information table group 7130 include additional attributes compared with the corresponding tables included in the storage information table group 4130 and the host information table group 6130.

A specific description is now given of additional attributes with reference to a host I/O path information table 7137 included in the integrated information table group 7130, and the host I/O path information table 4137 included in the storage information table group 4130.

Figure 17:
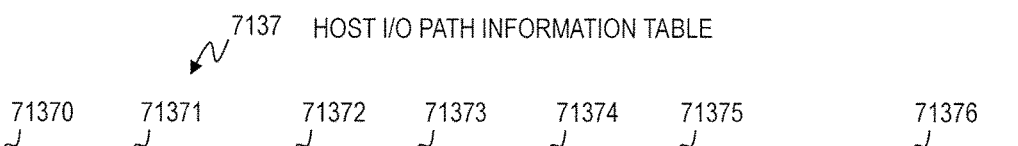
FIG. 17 is a diagram for showing an example of the host I/O path information table according to the first embodiment of this invention.

FIG. 17 is a diagram for showing an example of the host I/O path information table. The host I/O path information table 7137 is, as in the host I/O path information table 4137, a table representing the relationship between a host computer 2000 and a logical volume 1260 assigned to the host computer 2000.

Out of information held by the host I/O path information table 7137, a host ID 71730, a storage ID 71371, a port ID 71372, a volume ID 71373, and an LUN 71374 are the same as the information held by the I/O path information table 4137. The host I/O path information table 7137 further includes a change flag 71375 and a scheduled change date and time 71376 in one record.

Those pieces of information are information stored when the integrated management program 7110 generates, based on information notified by the storage management program 4110, information to be changed out of the information held by the host management computer 6000 in the host information table group 6130.

The change flag 71375 represents a type of the change, and the scheduled change date and time 71376 represents a date and time at which the change is scheduled to occur. In this embodiment, a three-digit number, each of the digits of which is "0" or "1", is stored in the change flag 71375. A row on which the value of the change flag 71375 is "100" represents information to be generated by the change; "010", information to be changed by the change; "001", information to be deleted by the change; and "000", information corresponding to none of those pieces of information (not to be changed). It should be noted that the information not to be changed means information whose state is fixed.

A description has been given of the integrated information table group 7130.

The integrated management information table group 7140 of the integrated management computer 7000 illustrated in FIG. 3 is a set of tables for storing management information used when the integrated management program 7110 manages the configurations of the storage apparatus 1000 and the host computers 2000. In this embodiment, the integrated management information table group 7140 includes a management subject resource correspondence table 7141 and an information-change-by-management-operation template table 7142.

FIG. 18 is a diagram for showing an example of the management subject resource correspondence table. The management subject resource correspondence table 7141 is a table for storing information representing a correspondence between the configuration information stored by the storage management computer 4000 in the storage information table group 4130 and the configuration information stored by the host management computer 6000 in the host information table group 6130.

The management subject resource correspondence table 7141 includes a management computer name 71410 representing the name of a first management computer, a resource 71411 representing a resource name set to configuration information on the first management computer, an attribute 71412 representing attribute names set to the configuration information on the first computer, a key 71413 representing whether each attribute 71412 is key information for uniquely identifying information on the resource 71411, a management computer name 71414 representing the name of a second management computer, a resource 71415 representing a resource name set to configuration information on the second management computer, an attribute 71416 representing attribute names set to the configuration information on the second management computer, and a key 71417 representing whether each attribute 71416 is key information for uniquely identifying information on the resource 71415 in one record.

Referring to FIG. 18, a description is now given of a specific example. A row on which the management computer name 71410 is "storage management computer" and the resource 71411 is "host" is focused on. The information (host information table 4136) on the host computer 2000 stored by the storage management computer 4000 in the storage information table group 4130 is equal to a combination of the information (server information table 6131) on the host computer 2000 and the information (HBA information table 6132) on the HBA stored by the host management computer 6000 in the host information table group 6130. Then, in order to determine whether or not those pieces of information are equal to each other, the IP address 41361 of the host information table 4136 and the address 61311 of the server information table 6131 only needs to be compared with each other, and the WWN 41362 of the host information table 4136 and the WWN 61321 of the HBA information table 6132 only needs to be compared with each other. In other words, the management subject resource correspondence table (management subject resource relationship information) 7141 associates, for the storage apparatus 1000 assigned to the host computer 2000, the information on the host management computer 6000 managing the host computer 2000 and the information on the storage management computer 4000 managing the storage apparatus 1000 with each other.

FIG. 19 and FIG. 20 are tables for illustrating an example of the information-change-by-management-operation template table (first template information). A first half of the table is shown in FIG. 19, and a second half of the table is shown in FIG. 20.

The information-change-by-management-operation template table 7142 is a table for storing templates each representing changes in another management computer as a result of an operation of changing a setting on the storage apparatus 1000 or the host computer 2000 carried out by the storage management computer 4000 or the host management computer 6000.

The information-change-by-management-operation template table 7142 includes a management computer name 71420 representing the name of a management computer for carrying out an operation of changing a setting, a management operation name 71421 representing the name of a management operation, a name of management computer to be changed 71422 representing the name of a management computer whose information be changed by an influence of the management operation, a changed resource 71423 representing a type of a resource whose information is to be changed, a change type 71424 representing a type of the change, and a change content 71425 representing contents of the change in one record.

In this embodiment, the content described in the change content 71425 is described in a manner compliant with the same grammar as the change content 41423 of the information-change-by-storage-management-operation template table 4142. It should be noted that the change content 71425 is different from the change content 41423 in that two functions, "LINK" and "GENERATE_ID", are used.

The LINK function is a function of acquiring corresponding pieces of information based on the integrated information table group 7130 and the management subject resource correspondence table 7141. The LINK function takes, as parameters, a type (corresponding to the resource 71415) of a destination of the correspondence, a type (corresponding to the resource 71411) of a source of the correspondence, a condition for uniquely identifying a resource of the source of the correspondence, and the name of an attribute of the resource of the destination of the correspondence from which information needs to be acquired.

The GENERATE_ID function is a function of generating a temporary ID used until the corresponding resource is actually generated. The generated ID may be any ID as long as the ID can uniquely identify the corresponding resource.

Referring to FIG. 19 and FIG. 20, a specific description is now given. On a row on which the management computer name 71420 is "storage management computer" and the management operation name 71421 is "logical volume assignment", when the storage management computer 4000 carries out an operation of the logical volume assignment, an instance (a record of the disk information table 6133) of the disk is generated on the host management computer 6000.

The values of the attributes set to the instance to be generated in the disk information table 6133 are as described below. First, the LINK function is used, and the server information table 6131 is set as the resource of the correspondence destination, and the host information table 4136 is set as the resource of the correspondence source. Then, the value of the server ID 61310 in the server information table 6131 is acquired under such a condition that the host ID 41360 of the host information table 4136 is the same information as a value specified by "host ID" parameter of the logical volume assignment operation. Then, the acquired value is stored in the server ID 61330 shown in FIG. 15.

For example, when the value specified by the "host ID" parameter is "Host.1", the LINK function identifies a row on which the host ID 41360 is "Host.1" from the host information table 4136. Further, the LINK function refers to the management subject resource correspondence table 7141, to thereby identify such a fact that information in the IP address 41361 of the host information table 4136 is necessary to compare the host information table 4136 and the server information table 6131 with each other, and acquires this information ("192.168.0.11"). Then, the LINK function refers to the server information table 6131, to thereby identify a row whose value in the address 61311 matches "192.168.0.11". Finally, the LINK function acquires the information ("Server.1") on the server ID 61310 from the information on this row. Consequently, "Server.1" is to be stored in the server ID 61330 set to an instance to be generated.

The temporary ID generated by the GENERATE_ID function is stored in the disk ID 61331 of the disk information table 6133 shown in FIG. 15.

In the capacity 61332, the value of the capacity 41342 on a row including the volume ID 41341 of FIG. 7 matching the value specified by the "volume ID" parameter out of the information stored in the logical volume information table 4134 is stored.

In the HBA ID 61333, the value of the HBA ID 61320 on a row on which the server ID 61323 is the ID (in this example, "Server.1") identified by using the LINK function out of the information stored in the HBA information table 6132 is stored.

In the target port ID 61334, the value of the target port ID 61341 of the target port information table 6134 acquired while the resource of the correspondence destination is the target port information table 6134 and the resource of the correspondence source is the port information table 4135 under such a condition that the storage ID 41350 of the port information table 4135 matches the value specified by the "storage ID" parameter, and the port ID 41351 matches the value specified by the "port ID" parameter.

In the LUN 61335, a value specified by a "LUN" parameter is stored.

A description has been given of the integrated management information table group 7140.

The control apparatus 7200 of FIG. 3 includes a processor for controlling the execution of the programs in the memory 7100, inputs/outputs of data via the input/output I/F 7400, and inputs/outputs of data and control commands via the I/F 7300.

The integrated management computer 7000 may additionally include an input apparatus to be used by an administrator of the integrated management computer 7000 to input data, an output apparatus for providing information to the administrator of the integrated management computer 7000, and a secondary storage apparatus for storing data. Moreover, the various tables held by the integrated management computer 7000 may be held on the secondary storage apparatus as well as on the memory.

It should be noted that the integrated management computer 7000, the storage management computer 4000, and the host management computer 6000 are illustrated as independent apparatus in FIG. 2, but the configuration is not limited to this example, and the integrated management computer 7000 may be stored in the same housing as that for the storage management computer 4000 and the host management computer 6000. The host management computer 7000 may additionally include programs for managing the switch apparatus 3000 and the switch apparatus 5000.

Information such as programs and tables for realizing each of the functions of each of the computers can be stored in storage devices such as a storage apparatus, a non-volatile semiconductor memory, a hard disk drive, and a solid state drive (SSD), or a computer-readable, non-transitory data storage medium such as an IC card, an SD card, and a DVD.

The control apparatus including the processor carries out processing by following the programs of the respective function modules, thereby operating as the function modules for realizing predetermined functions. For example, the control apparatus carries out processing by following the integrated management program, to thereby function as an integrated management module. The same holds true for the other programs. Further, the control apparatus also operates as a function module for realizing plurality of respective pieces of processing carried out by each of the programs. The computer and the computer system are an apparatus and a system including those function modules.

<A2. Description of Data Processing>

A description is now given of a procedure of data processing according to this embodiment.

Figure 21:
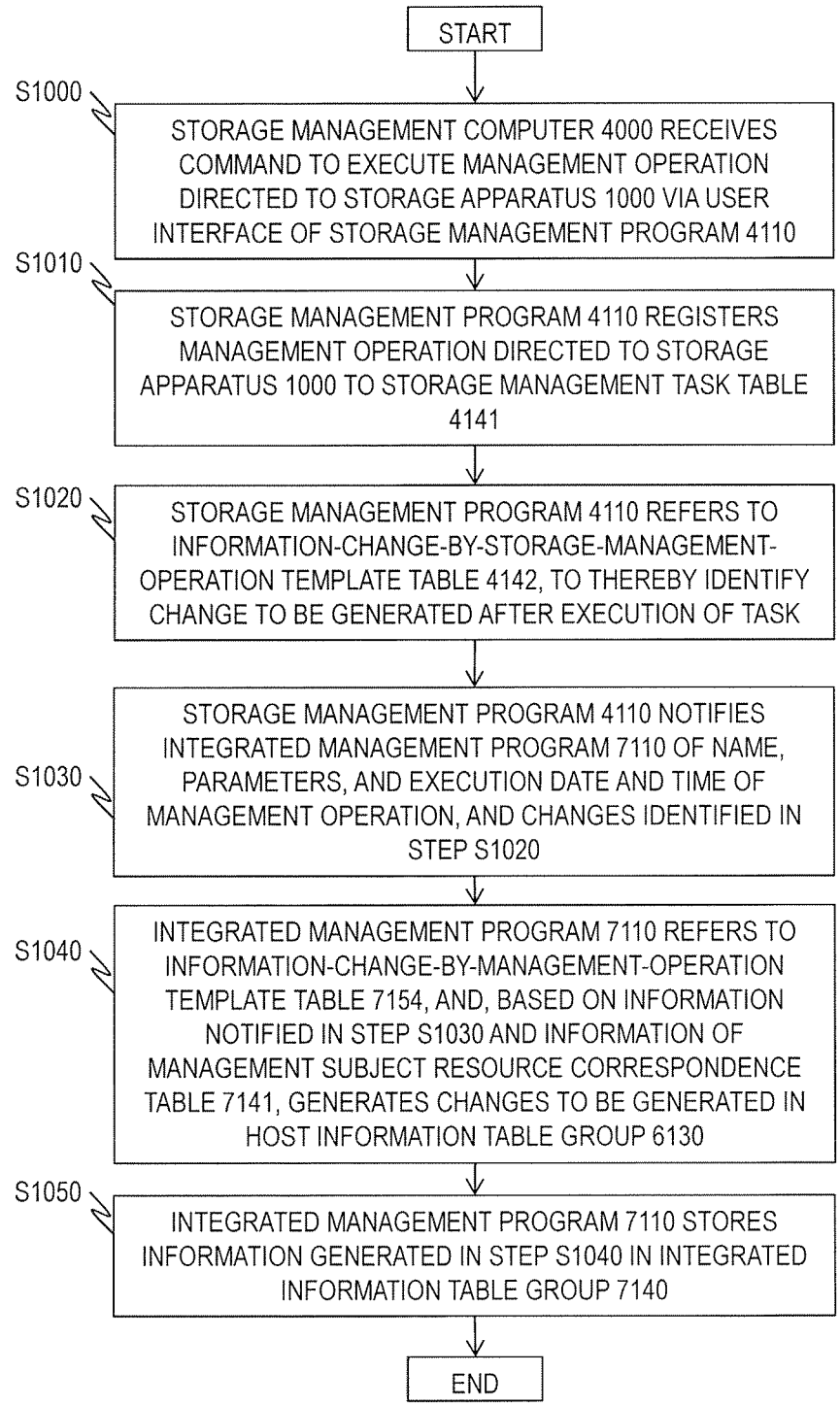
FIG. 21 is a flowchart for illustrating an example of processing of registering a management operation directed to the storage apparatus according to the first embodiment of this invention.

FIG. 21 is a flowchart for illustrating an example of processing of registering a management operation directed to the storage apparatus 1000 onto a management software. This processing is started by a command of the administrator using the storage management computer 4000.

In this embodiment, the administrator of the storage apparatus 1000 instructs execution of the management operation directed to the storage apparatus 1000 from the input apparatus (not shown) via a user interface of the storage management program 4110. The storage management computer 4000 receives the management operation on the storage management program 4110, and registers the management operation.

In this processing, first, in Step S1000, the storage management computer 4000 receives the command to execute the management operation directed to the storage apparatus 1000 via the user interface of the storage management program 4110.

Then, in Step S1010, the storage management program 4110 registers the management operation directed to the storage apparatus 1000 to the storage management task table 4141.

Then, in Step S1020, the storage management program 4110 refers to the information-change-by-storage-management-operation template table 4142, to thereby identify changes that occur after the execution of the management operation received in Step S1000.

Then, in Step S1030, the storage management program 4110 notifies the integrated management computer 7000 executing the integrated management program 7110 of the name, parameters, and execution date and time of the management operation, and the changes identified in Step S1020.

Then, in Step S1040, in the integrated management computer 7000, the integrated management program 7110 refers to the information-change-by-management-operation template table 7142, and, based on the information notified in Step S1030 and the information of the management subject resource correspondence table 7141, generates changes that occur in the host information table group 6130.

Then, in Step S1050, the integrated management program 7110 stores the information generated in Step S1040 in the integrated management information table group 7140.

As a result of the above-mentioned processing, the processing of registering the management operation directed to the storage apparatus 1000 to the storage management program 4110 is completed. It should be noted that when the administrator wants to immediately carry out the management operation directed to the storage apparatus 1000, the administrator only needs to specify a current date and time to the execution date and time of the management task.

Figure 22:
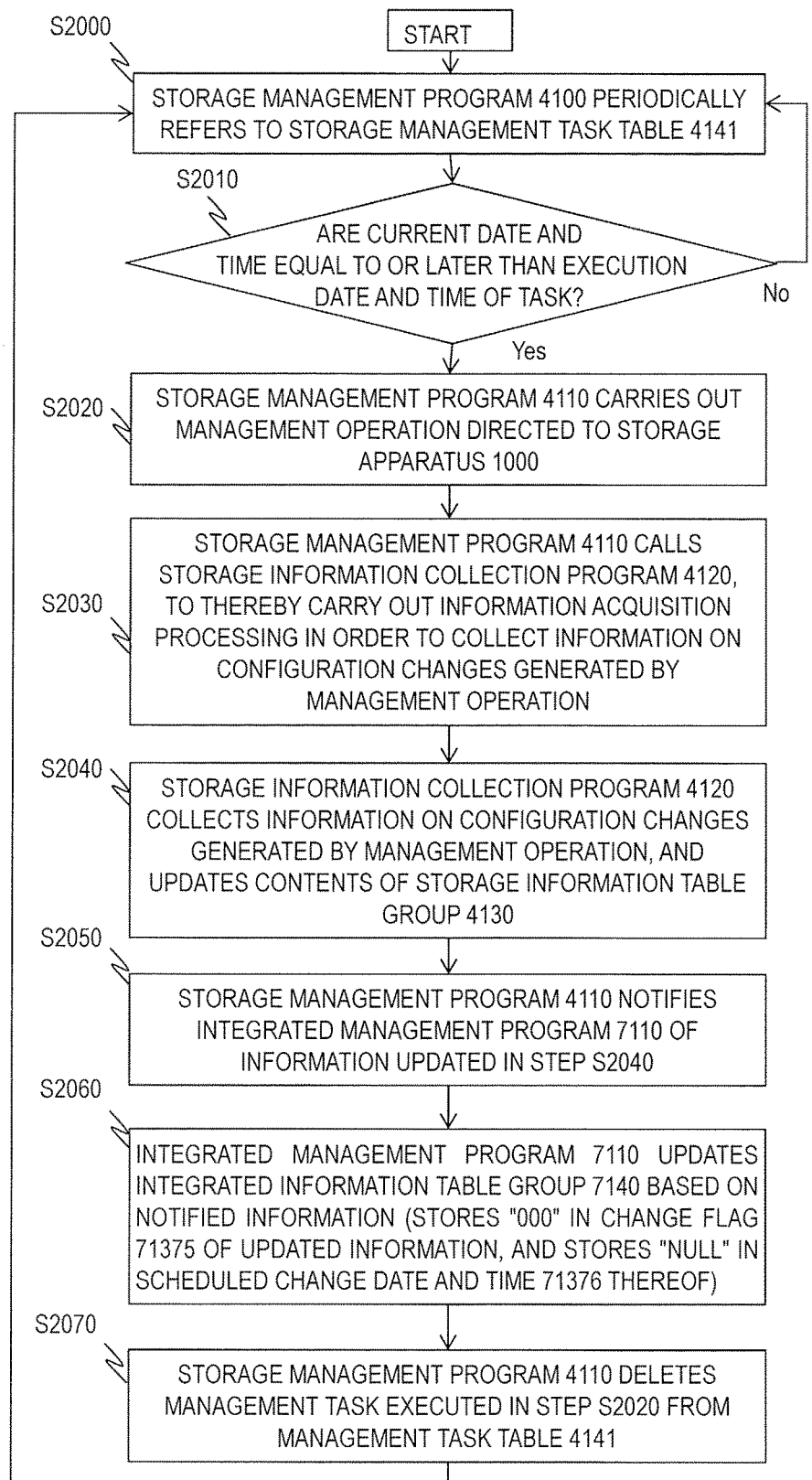
FIG. 22 is a flowchart for illustrating an example of the processing carried out when the storage management program carries out according to the first embodiment of this invention.

FIG. 22 is a flowchart for illustrating an example of the processing carried out when the storage management program 4110 carries out the management operation directed to the storage apparatus 1000 according to this embodiment. It should be noted that, in this embodiment, the processing of FIG. 22 is carried out on a thread different from those of the other pieces of processing. In other words, the processing of FIG. 22 is carried out in parallel with the other pieces of processing after the storage management computer 4000 starts.

In this processing, first, in Step S2000, the storage management program 4110 periodically (at a predetermined cycle) refers to the storage management task table 4141. It should be noted that the time interval at which the storage management program 4110 refers to the storage management task table 4141 may be determined in advance, or may be set by the administrator via the input apparatus (not shown).

Then, in Step S2010, the storage management program 4110 compares the current date and time and the execution date and time 41411 of the storage management task table 4141 with each other, to thereby determine whether the current date and time is equal to or later than the execution date and time 41411 of the management task.

When the current date and time is not equal to the execution date and time 41411 of the management task, and is not later than the execution date and time, the storage management program 4110 transitions to Step S2000. When the current date and time is equal to or later than the execution date and time 41411 of the management task, the storage management program 4110 transitions to Step S2020.

Then, in Step S2020, the storage management program 4110 carries out the management operation directed to the storage apparatus 1000. The management operation includes, for example, an operation of generating the logical volume 1260 from the pool 1120 and an operation of assigning the logical volume 1260 to the host computer 2000, but is not particularly limited.

Then, in Step S2030, the storage management program 4110 calls the storage information collection program 4120, to thereby collect the configuration information on the storage apparatus 1000 changed by the management operation carried out in Step S2020.

Then, in Step S2040, the storage management program 4110 stores (updates) the information collected by the storage information collection program 4120 in the storage information table group 4130.

Then, in Step S2050, the storage management program 4110 notifies the integrated management computer 7000 on which the integrated management program 7110 is running of the information updated in Step S2040.

Then, in Step S2060, the integrated management program 7110 updates the integrated management information table group 7140 based on the information notified in Step S2050. On this occasion, the integrated management program 7110 stores "000" in the change flag 71375 of the information updated by the integrated management program 7110, and stores "null" in the scheduled change date and time 71376 thereof.

Then, in Step S2070, the storage management program 4110 deletes the management task executed in Step S2020 from the storage management task table 4141. When the deletion is finished, the storage management program 4110 transitions to Step S2000, and repeats the above-mentioned processing.

As a result of the processing, the processing of executing the management operation directed to the storage apparatus 1000 is completed on the storage management computer 4000 and the integrated management computer 7000.

Figure 23:
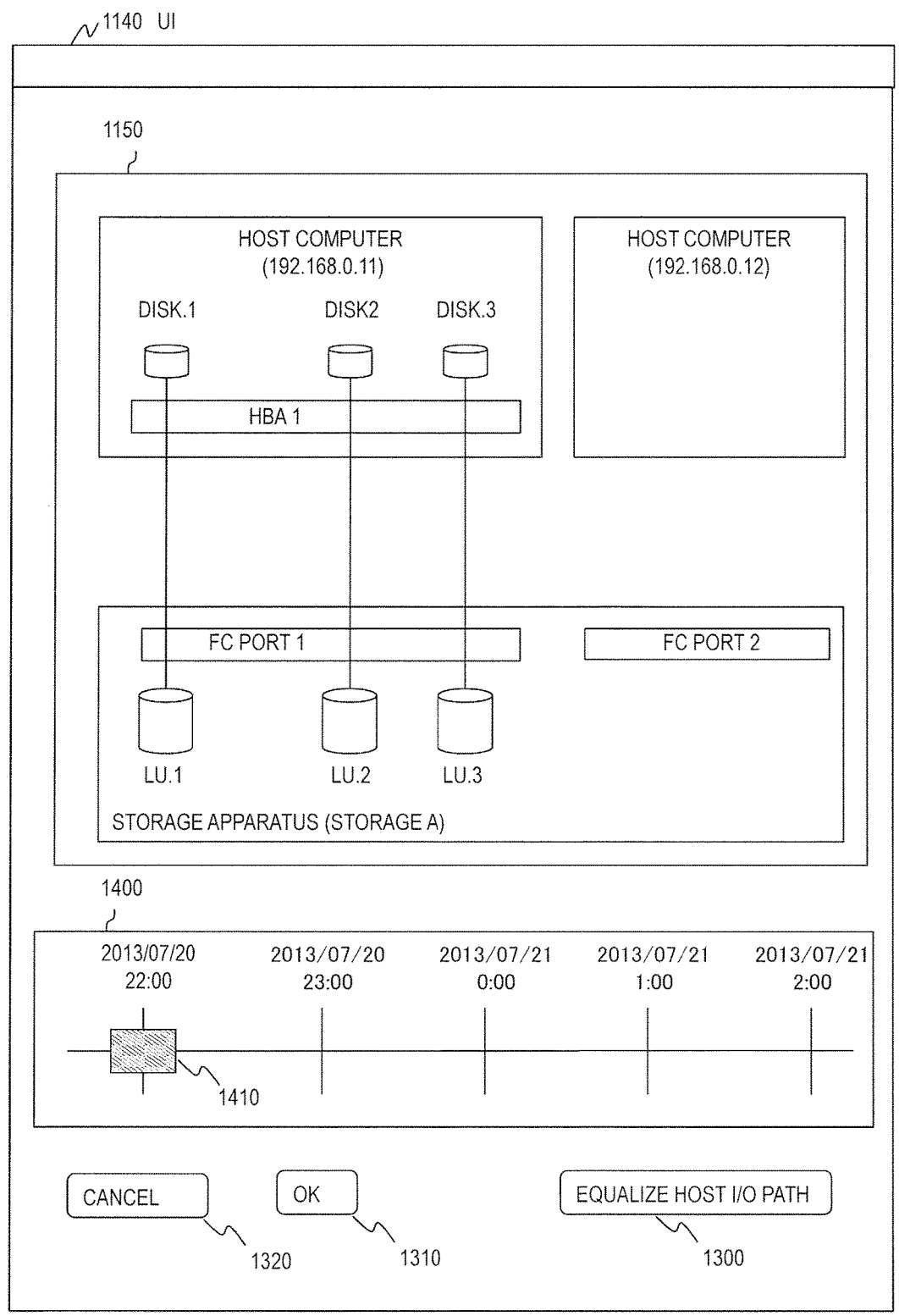
FIG. 23 is a diagram for illustrating an example of a screen for displaying information on the storage apparatus according to the first embodiment of this invention.

FIG. 23 is a diagram for illustrating an example of a screen for displaying information on the storage apparatus 1000 and the host computer 2000 on a user interface UI 1140 provided by the integrated management program 7110. This user interface UI 1140 is output to, for example, an output apparatus (not shown) coupled to the input/output I/F 7400 of the integrated management computer 7000.

The UI 1140 includes an information display section UI 1150 for displaying information on the storage apparatus 1000 and the host computer 2000, a date and time specification section UI 1400 for specifying a time point corresponding to information to be displayed, and a button 1300 for carrying out host I/O path equalizing processing described later, an OK button 1310, and a cancel button 1320.

In this embodiment, on the information display section UI 1150, the configuration information on the storage apparatus 1000 and the host computer 2000 at a date and time specified by a slider 1410 of the date and time specification section UI 1400 is displayed.

On the information display section UI 1150, out of the information stored in the integrated management information table group 7140, information whose scheduled change date and time 71376 is "null" or is before the date and time specified by the slider 1410 of the date and time specification section UI 1400 is displayed. For example, in FIG. 23, on the information display section UI 1150, pieces of information whose scheduled date and time 71376 is "null" or before "2013/07/20 22:00" are displayed.

Figure 24:
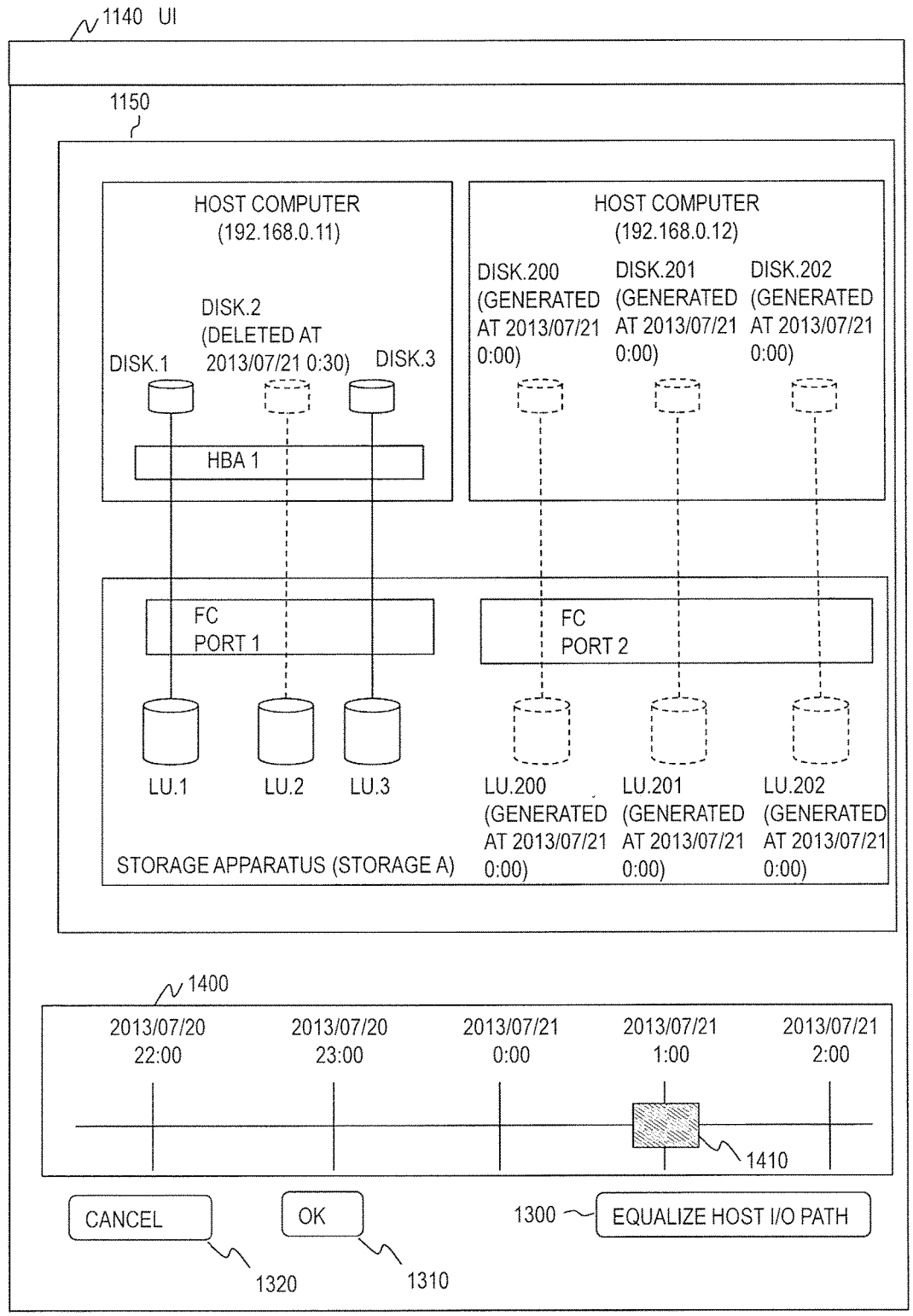
FIG. 24 is a diagram for illustrating another example of the information display on the user interface according to the first embodiment of this invention.

FIG. 24 is a diagram for illustrating another example of the information display on the user interface UI 1140 provided by the integrated management program 7110.

In FIG. 24, "2013/07/21 1:00" is specified on the slider 1410 of the date and time specification section UI 1400, which is different from the example illustrated in FIG. 23. Moreover, as a result, on the information display section UI 1150, information different from that of FIG. 23 is displayed. On the UI 1140 of FIG. 24, elements indicated by the broken lines represent resources in each of which a change is to occur before the date and time specified by the slider 1410 of the date and time specification section UI 1400.

For example, in FIG. 24, such a fact that a disk (Disk.2) assigned to a host computer (192.168.0.11) is deleted at 2013/07/21 0:30 and a host I/O path to the logical volume (LU.2) is thus deleted is illustrated.

Moreover, such a fact that three logical volumes (LU.200, LU.201, and LU.202) are assigned to the host computer (192.168.0.12) at 2013/07/21 0:00 is illustrated.

Figure 25:
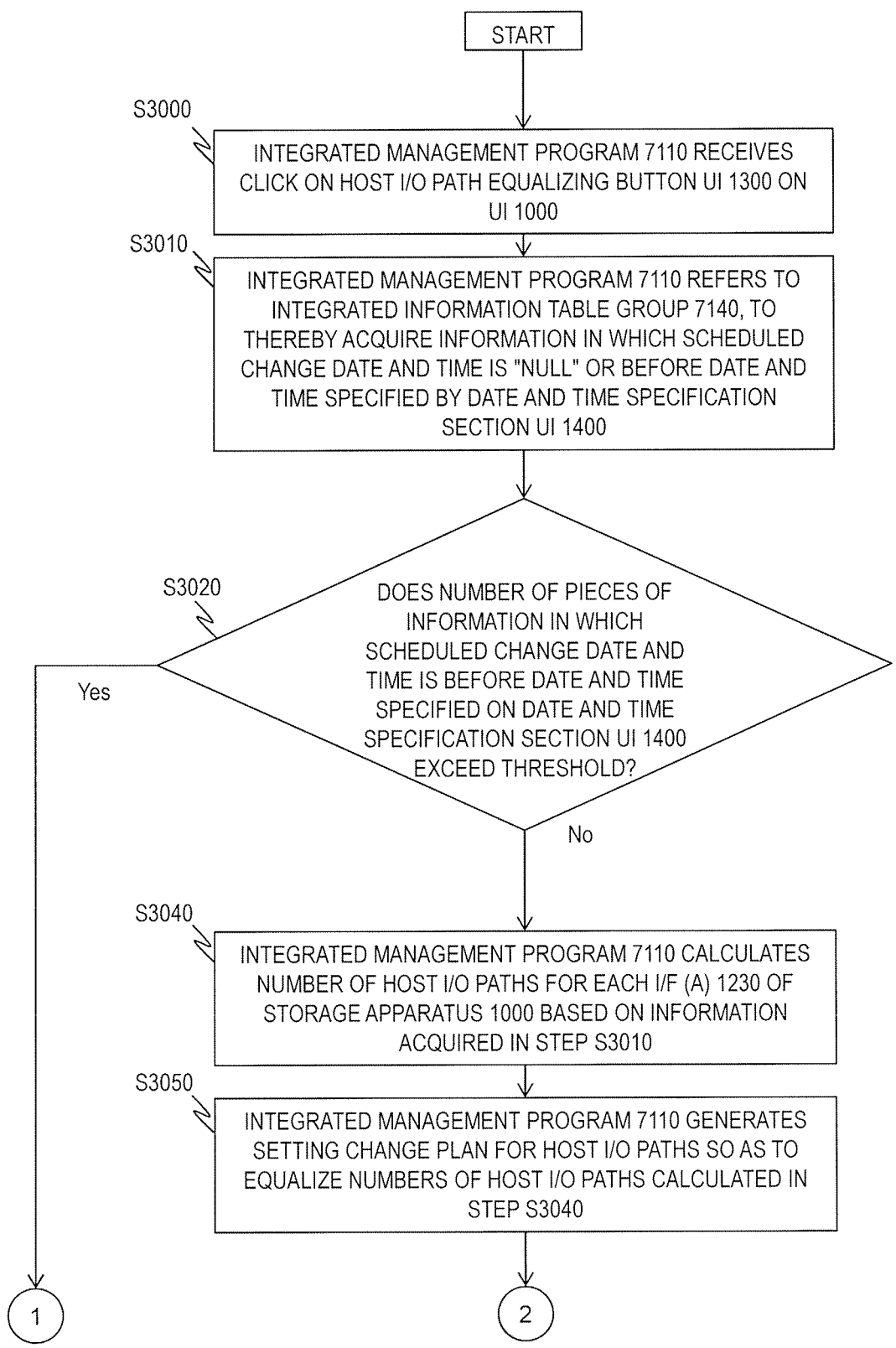
FIG. 25 is a first half of a flowchart for illustrating an example of the processing of equalizing the host I/O paths by the integrated management computer according to the first embodiment of this invention.
Figure 26:
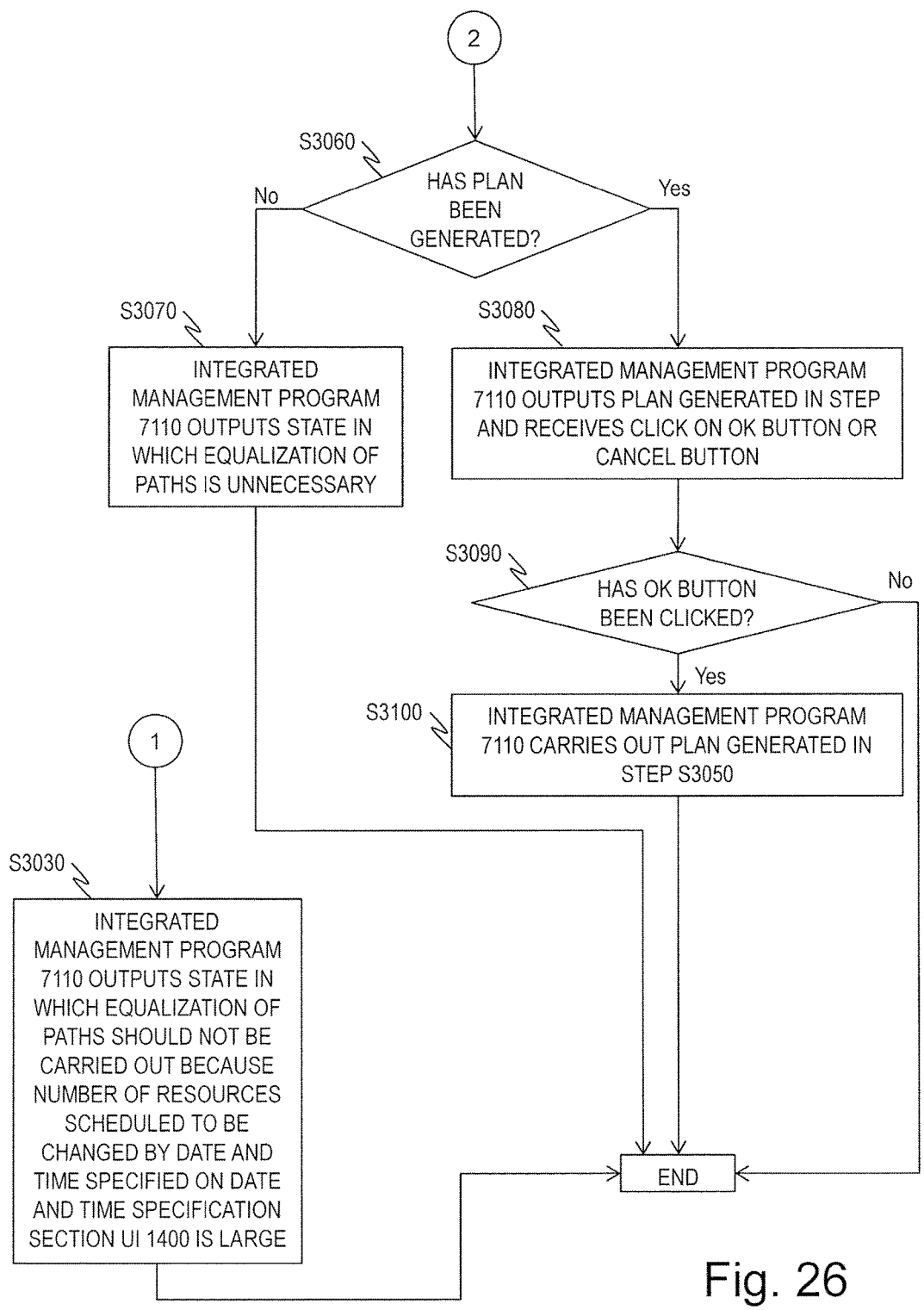
FIG. 26 is a second half of the flowchart for illustrating an example of the processing of equalizing the host I/O paths by the integrated management computer according to the first embodiment of this invention.

FIG. 25 and FIG. 26 are flowcharts for illustrating an example of the processing of equalizing the host I/O paths by the integrated management computer 7000. It should be noted that a first half of the processing is illustrated in FIG. 25, and a second half of the processing is illustrated in FIG. 26. This processing is carried out when a command to equalize the I/O paths is received on the integrated management computer 7000. In this processing, the integrated management program 7110 equalizes the numbers of the host I/O paths between the storage apparatus 1000 and the host computer 2000 for respective ports 1230 of the storage apparatus 1000.

In this processing, first, in Step S3000 of FIG. 25, the integrated management computer 7000 executing the integrated management program 7110 receives such an event that the host I/O path equalizing button 1300 of the UI 1140 is clicked.

Then, in Step S3010, the integrated management program 7110 refers to the integrated management information table group 7140, to thereby acquire pieces of information in which the scheduled change date and time 71376 of FIG. 17 is "null" or before the date and time specified by the slider 1410 of the date and time specification section UI 1400.

Then, in Step S3020, the integrated management program 7110 determines whether or not the number of pieces of information in which the scheduled change date and time 71376 is before the date and time specified by the slider 1410 of the date and time specification section UI 1400 out of the information acquired in Step S3010 from the integrated management information table group 7140 exceeds a predetermined threshold.

When a result of the determination in Step S3020 is Yes, the integrated management program 7110 transitions to Step S3030 of FIG. 26. On the other hand, when the result of the determination in Step S3020 is No, the integrated management program 7110 transitions to Step S3040. It should be noted that the threshold in Step S3020 may be a fixed value, or a value received via the input apparatus from the administrator using the integrated management computer 7000.

In Step S3030 of FIG. 26, the integrated management program 7110 outputs a state in which the equalization of the paths should not be carried out because the number of resources scheduled to be changed by the date and time specified by the slider 1410 of the date and time specification section UI 1400 is large. This output is directed, for example, to an output apparatus (not shown) and the like via the input/output I/F 7400. Besides, the output may be directed to other computers.

On the other hand, in Step S3040 of FIG. 25, the integrated management program 7110 calculates the number of the host I/O paths for each port 1230 of the storage apparatus 1000 based on the information acquired in Step S3010.

Then, in Step S3050, the integrated management program 7110 generates a management task (setting change plan) of changing the host I/O paths so that the numbers of the host I/O paths calculated in Step S3040 are equalized over all the ports 1230.

Then, in Step S3060 of FIG. 26, the integrated management program 7110 determines whether or not the corresponding plan has been generated. When the plan has been generated, the integrated management program 7110 transitions to Step S3080. When the plan has not been generated, the integrated management program 7110 transitions to Step S3070.

In Step S3070, the integrated management program 7110 outputs, via the input/output I/F 7400, a state in which the numbers of the host I/O paths of the ports 1230 have already been equalized, and further equalizing is no longer necessary.

In Step S3080, the integrated management program 7110 outputs the plan generated in Step S3050 via the input/output I/F 7400, and receives a click on the OK button 1310 or the cancel button 1320 of the user interface UI 1140.

Then, in Step S3090, the integrated management program 7110 determines whether or not the OK button 1310 has been clicked. When the OK button 1310 has been clicked, the integrated management program 7110 transitions to Step S3100. When the OK button 1310 has not been clicked (that is, when the cancel button 1320 has been clicked), the integrated management program 7110 finishes this processing.

Then, in Step S3100, the integrated management program 7110 carries out the plan generated in Step S3050. As a result, the numbers of the host I/O paths are equalized.

By the above-mentioned processing, the integrated management program 7110 computes the processing of equalizing the numbers of the host I/O paths between the storage apparatus 1000 and the host computer 2000 for the respective ports 1230 of the storage apparatus 1000.

A specific description is now given of a combination of the examples of FIG. 23 and FIG. 24. In FIG. 23, three host I/O paths exist in an FC port 1 of the storage apparatus (storage A), and no host I/O path exists in an FC port 2.

Therefore, when the administrator clicks the host I/O path equalizing button 1300 via the input apparatus on the screen of FIG. 23, the integrated management program 7110 generates a plan of changing one or two of the host I/O paths of the FC port 1 so as to couple to the host computer (192.168.0.11) via the FC port 2 (Step S3050 of FIG. 25).

On the other hand, in FIG. 24, the configuration information at a date and time different from that of FIG. 23 is shown. Two host I/O paths exist in the FC port 1, and three host I/O paths (broken lines of FIG. 24) exist in the FC port 2.

Therefore, when the administrator clicks the host I/O path equalizing button 1300 via the input apparatus on the screen of FIG. 24, the integrated management program 7110 determines that the host I/O paths are sufficiently equalized between the two ports, and does not generate a plan of equalizing the host I/O paths (determination in Step S3060 is No).

It should be noted that the processing in Step S3010 of this processing can be changed so that the integrated management program 7110 refers to the integrated management information table group 7140, to thereby acquire only information in which "null" is stored in the scheduled change date and time 71376. In this case, information on a resource scheduled to be changed at a certain time point in the future is ignored in the equalizing processing for the host I/O paths. This processing can equalize the host I/O paths based only on the information which does not change. It should be noted that a certain time point in the future is an input or specified future time point or time range.

Further, in the processing in Step S3010 of this processing, the integrated management program 7110 may refer to the integrated management information table group 7140, to thereby count the number of pieces of information in which information other than "null" is stored in the scheduled change date and time 71376. Then, when this number exceeds a predetermined threshold, the integrated management program 7110 may not generate a plan in Step S3050, and may output this state in Step S3030. This processing can avoid equalizing the host I/O paths when the number of pieces of information on the resources scheduled to be changed at a certain time point in the future is large. In other words, when the number of pieces of information on the resources scheduled to be changed at the input or specified future time point or time range exceeds the threshold, the management operation such as the equalization of the host I/O paths is inhibited. On the other hand, when the number of pieces of information on the resources scheduled to be changed at the input or specified future time point or time range is equal to or less than the threshold, the management operation such as the equalization of the host I/O paths is carried out.

The data processing according to the first embodiment has been described. By those pieces of processing, when the storage management computer 4000 is carrying out or will carry out, in the future, the operation of the setting change directed to the storage apparatus 1000, the integrated management computer 7000 can identify changes that occur in the information acquired from the storage management computer 4000 and the host management computer 6000 by the operation of the setting change.

Therefore, the integrated management computer 7000 can carry out the management operations (such as the display of the configuration information and the processing of equalizing the host I/O paths) by using the information on the storage apparatus 1000 and the host computer 2000 at the current time point as well as the information at the future time point.

As a result, the administrator using the integrated management computer 7000 can manage the storage apparatus 1000 and the host computer 2000 in consideration of the changes that occur in the future. In other words, the administrator using the integrated management computer 7000 can carry out the management operation based on the information whose consistency with the entire computer system is guaranteed.

<Related Art Case>

A more detailed description is given of the problem of the related art by way of an example. For example, in the related art, such a configuration that a computer system constructed by storage apparatus and host computers is managed by three types of management software including a storage management software, a host management software, and an integrated management software is considered. It should be noted that the integrated management software acquires configuration information on the storage apparatus held by the storage management software and configuration information on the host computers held by the host management software, and has integrated configuration information formed by integrating those pieces of configuration information.

In this configuration, such a case that the storage management software carries out an operation of setting change of assigning a logical storage volume (logical volume) on the storage apparatus to the host computer is considered. On this occasion, first, the storage management software carries out the operation of the setting change on the storage apparatus. As a result, the logical volume on the storage apparatus becomes recognizable from the host computer.

Then, the storage management software reflects a configuration change caused by the operation of the setting change carried out by itself to the configuration information on the storage apparatus held by itself. In this example, the relationship of the assignment between the logical volume held by the storage apparatus and the host computer is reflected as the changed information.

Then, the host management software reflects the configuration change caused by the operation of the setting change carried out by the storage management software to the configuration of the host computer held by itself. As a method of the reflection, the following methods exist. In other words, the methods are a method of instructing, by an administrator (or a user) of the host management software, an update of the configuration information (acquisition again of the configuration information from the host computer), a method of periodically acquiring, by the host management software, the configuration information on the host computer, and a method of notifying, by the host computer, the host management software of the configuration change occurring in the host computer.

A point on this occasion is that, in any of the above-mentioned methods, the storage management software or the host management software can reflect the configuration change caused by the operation of the setting change carried out by the storage management software to the configuration information only after the operation of the setting change is completed.

Thus, in this example, while the storage management software is carrying out the operation of the setting change, when the integrated management software carries out a management operation (such as a display of the information of the overall configuration from the storage apparatus to the host computer) based on the configuration information on the storage apparatus of the storage management software and the configuration information on the host computer of the host management software, the change caused by the operation of the setting change has been reflected to the configuration information on the storage apparatus. However, such an inconsistency that the change has not been reflected to the configuration information on the host computer occurs. Therefore, there is such a problem that the integrated management computer carries out the management operation based on the information inconsistent as the entire computer system.

In contrast, according to this invention, in order to solve the above-mentioned problem, the integrated management computer 7000 integrates the configuration information in consideration of the management operation. In other words, when the storage management computer 4000 is carrying out or will carry out, in the future, the operation of the setting change directed to the storage apparatus 1000, the integrated management computer 7000 can identify changes that occur in the information acquired from the storage management computer 4000 and the host management computer 6000 by the operation of the setting change, and provides the configuration information including the identified changes.

As a result, the integrated management computer 7000 can carry out the management operations (such as the display of the configuration information and the processing of equalizing the host I/O paths) by using the information on the storage apparatus 1000 and the host computer 2000 at the current time point as well as the information at the future time point.

Second Embodiment

<B1. Configuration of System>

The configuration relating to hardware of a computer system according to a second embodiment of this invention is similar to that according to the first embodiment, and a description is now only given of a difference. The difference from the first embodiment is the configurations of the respective tables included in the integrated information table group 7130.

FIG. 27 is a host I/O path information table 7137*b* shown as an example of the table included in the integrated information table group 7130 according to this embodiment.

A difference between the host I/O path information table 7137*b* according to the second embodiment and the host I/O path information table 7137 according to the first embodiment is that the host I/O path information table 7137*b* newly includes a management computer name 71377*b* representing the name of the management computer carrying out the operation of the setting change, a task ID 71378*b* for identifying a task of the operation of the setting change, and a change condition 71379*b* representing a condition for the change of the host I/O path information.

Those pieces of information represent the change in the host I/O path information when the management task represented by the task ID 71378*b* executed by the management computer having the name represented by the management computer name 71377*b* reaches a result represented by the change condition 71379*b* at the date and time represented by the scheduled change date and time 71376.

For example, information on a row on which the host ID 71370 is "Host.2", the storage ID is "ST.2", the port ID 71372 is "Port.2", the volume ID is "LU.1", and the LUN is "1" is to be changed when a management task whose task ID is "3" carried out by the storage management computer 4000 at 2013/07/21 2:00 is successful. On the other hand, when this management task fails, the port ID 71372 of this host I/O path information becomes "Port.1".

<B2. Description of Data Processing>

Most of the processing according to this embodiment is the same as that of the first embodiment, and a description is now given only of a difference. The difference in the processing between the second embodiment and the first embodiment is a content of the processing in which the command to execute the management operation directed to the storage apparatus 1000, which is input via the user interface of the storage management program 4110 by the administrator of the storage apparatus 1000, is received by the storage management computer 4000, and the management operation is registered by the storage management program 4110.

Figure 28:
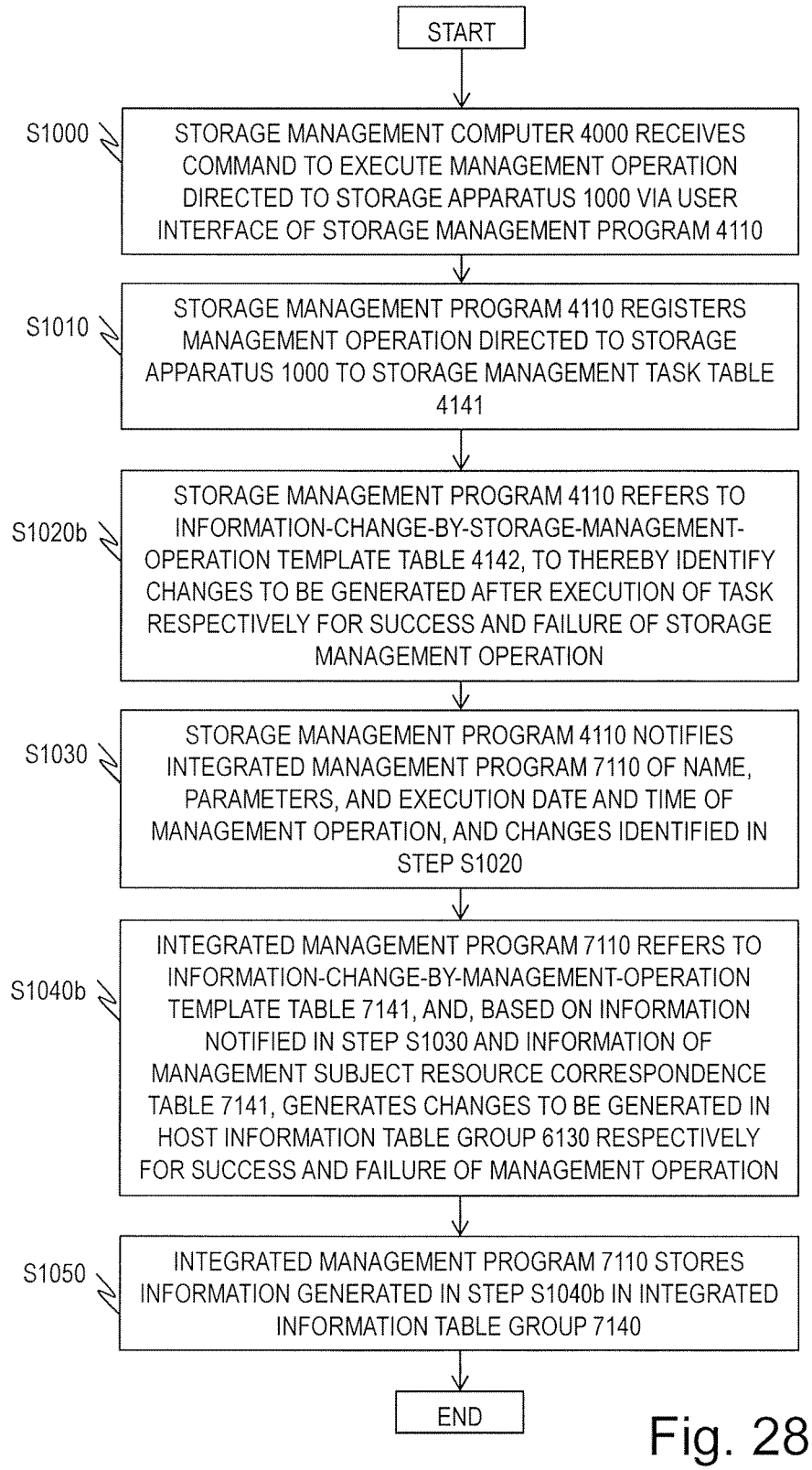
FIG. 28 is a flowchart for illustrating an example of the processing of registering the management operation directed to the storage apparatus according to a second embodiment of this invention.

FIG. 28 is a flowchart for illustrating an example of the processing of registering the management operation directed to the storage apparatus 1000 by the storage management computer 4000.

The processing illustrated in FIG. 28 is the same as the processing illustrated in FIG. 21 according to the first embodiment except for processing in Step S1020b and Step S1040b.

In Step S1020b, the storage management program 4110 refers to the information-change-by-storage-management-operation template table 4142, to thereby identify a change that occurs after the execution of the management task respectively for the successful and failed cases of the storage management operation.

Then, in Step S1040b, the integrated management program 7110 refers to the information-change-by-management-operation template table 7142, and based on the information notified by the storage management computer 4000 in Step S1030 and the information in the management subject resource correspondence table 7141, generates the changes that occur in the information acquired from the host information table group 6130 respectively for the successful and failed cases of the management operation.

It should be noted that, in this embodiment, in the user interface of the integrated management program 7110 illustrated in FIG. 23 and FIG. 24, the information may be displayed respectively for the successful and failed cases of the operation of the setting change carried out by the storage management program 4110. Moreover, in the host I/O path equalizing processing by the integrated management program 7110 illustrated in FIG. 25 and FIG. 26, the plan may be generated respectively for the successful and failed cases of the operation of the setting change carried out by the storage management program 4110.

The data processing according to the second embodiment has been described. By those pieces of processing, when the storage management computer 4000 is carrying out or will carry out, in the future, the operation of the setting change (or the management task) directed to the storage apparatus 1000, the integrated management computer 7000 can identify changes that occur in the information acquired from the storage management computer 4000 and the host management computer 6000, which are caused by the operation of the setting change, respectively for the successful and failed cases of the operation of the setting change. As a result, the integrated management computer 7000 can carry out the management operations (such as the display of the configuration information and the processing of equalizing the host I/O paths) by using the information on the storage apparatus 1000 and the host computer 2000 at the current time point as well as the information at the future time point respectively for the successful and failed cases of the operation of the setting change.

As a result, the administrator using the integrated management computer 7000 can manage the storage apparatus 1000 and the host computer 2000 in consideration of the changes that occur in the future.

Third Embodiment

<C1. Configuration of System>

Figure 29:
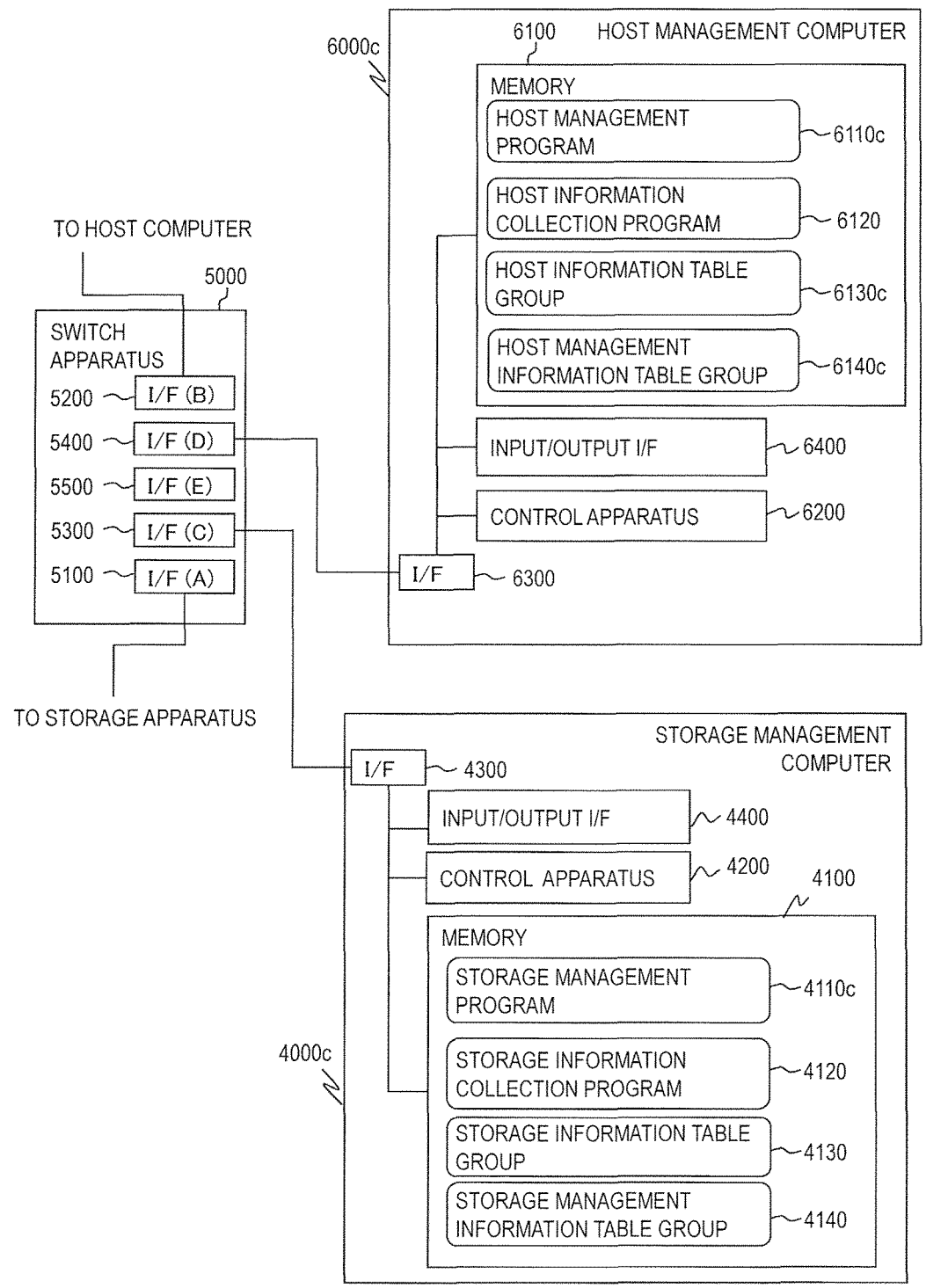
FIG. 29 is a block diagram for illustrating the configuration of a computer system according to a third embodiment of this invention.

FIG. 29 is a block diagram for illustrating the configuration of a computer system according to a third embodiment of this invention.

The computer system according to the third embodiment includes the storage apparatus 1000, the host computer 2000, the switch apparatus 3000, a storage management computer 4000c, the switch apparatus 5000, and a host management computer 6000c.

In the block diagram, the storage apparatus 1000, the host computer 2000, and the switch apparatus 3000 are the same as those of FIG. 2 of the first embodiment, and are omitted. Then, such an example in which each one of the storage management computer 4000c, the switch apparatus 5000, and the host management computer 6000c is arranged. It should be noted that the number of each type of the management computers is not limited to one, and the number only needs to be at least one. Most of this configuration is the same as that of the first embodiment, and a description is now given only of a difference.

The differences in the configuration of the computer system between the first embodiment illustrated in FIG. 2 and FIG. 3 and the third embodiment are, as illustrated in FIG. 29, such a point that the integrated management computer 7000 is absent, such a point that the configurations of the tables included in the host information table group 6130c held by the host management computer 6000c are different from the configurations of the tables included in the host information table group 6130 held by the host management computer 6000, and such a point that the host management computer 6000c holds a host management information table group 6140c.

The configurations of the tables included in the host information table group 6130c are such configurations that the change flag 71375 and the scheduled change date and time 71376 are added to the tables included in the host information table group 6130 according to the first embodiment in the same manner as the configurations of the tables included in the integrated information table group 7130.

The host management information table group 6140c has the same configuration as the integrated management information table group 7140 according to the first embodiment.

<C2. Description of Data Processing>

Most of the processing according to this embodiment is the same as that of the first embodiment, and a description is now given only of a difference. The following two points are differences in the processing between the third embodiment and the first embodiment.

The first difference is the processing in which the command to execute the management operation directed to the storage apparatus 1000, which is input via a user interface of the storage management program 4110c by the administrator of the storage apparatus 1000, is received by the storage management computer 4000, and the management operation is registered by the storage management program 4110c.

The second difference is such a point that the host management program 6110c executed by the host management computer 6000 includes processing of generating changes that occur in the host information table group 6130c based on the information notified by the storage management computer 4000 executing the storage management program 4110c and the information in the host management information table group 6140c.

Figure 30:
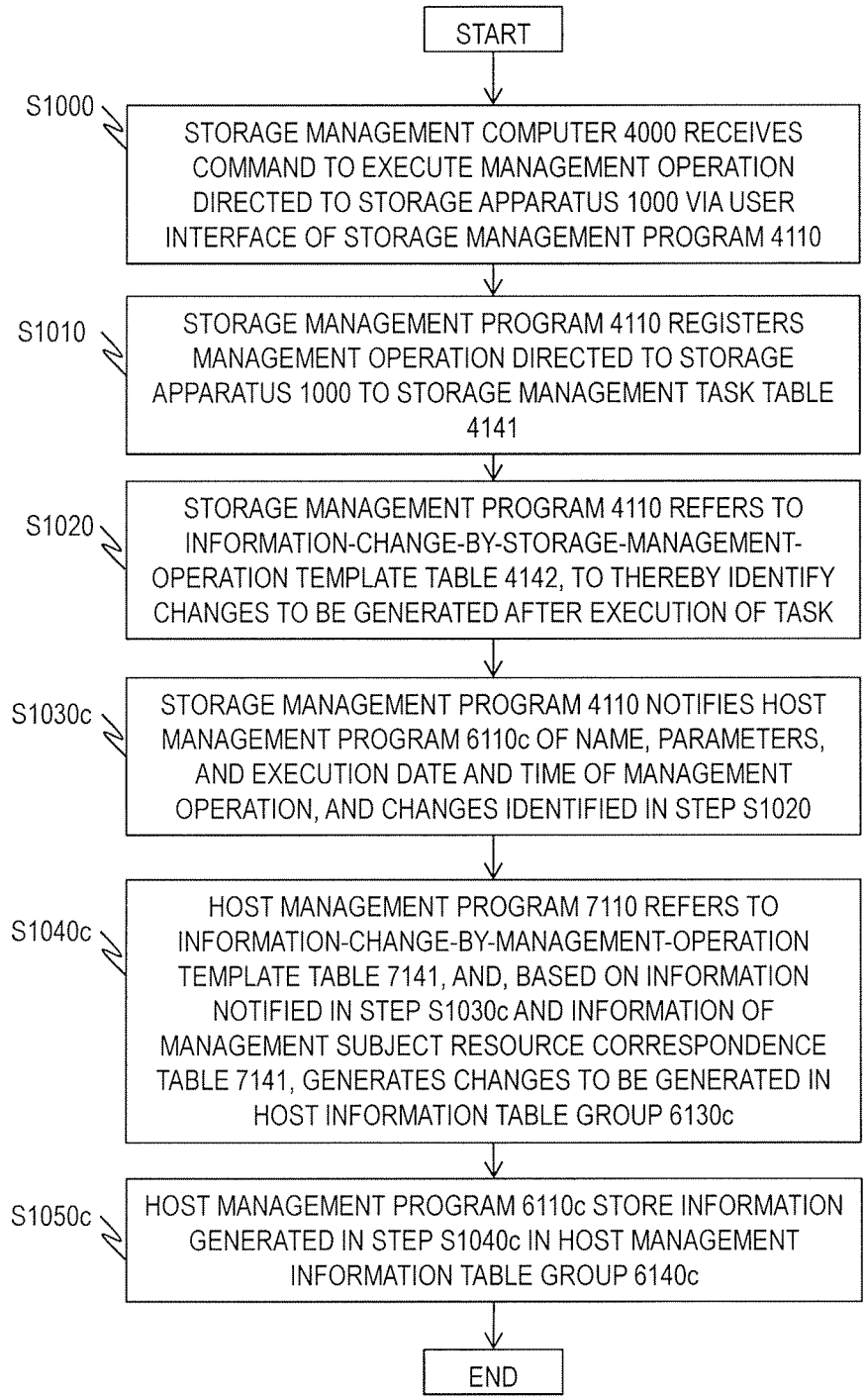
FIG. 30 is a flowchart for illustrating an example of the processing of registering the management operation directed to the storage apparatus according to a third embodiment of this invention.

FIG. 30 is a flowchart for illustrating an example of the processing in the third embodiment in which the command to execute the management operation directed to the storage apparatus 1000, which is input via the user interface of the storage management program 4110c by the administrator of the storage apparatus 1000, is received by the storage management computer 4000, and the management operation is registered by the storage management program 4110c.

The processing illustrated in FIG. 30 is the same as the processing illustrated in FIG. 21 according to the first embodiment except for processing in Step S1030c, Step S1040c, and Step S1050c.

Then, in Step S1030c, the storage management program 4110 notifies the host management computer 6000 executing the host management program 6110c of a name, parameters, and execution date and time of the management operation, and the change identified in Step S1020.

In Step S1040c, the host management program 6110 refers to the information-change-by-management-operation template table 7142, and, based on the information notified by the storage management computer 4000 in Step S1030c and the information in the management subject resource correspondence table 7141, generates the changes that occur in the host information table group 6130c.

In Step S1050c, the host management program 6110c stores the information generated in Step S1040c in the host management information table group 6140c.

It should be noted that, according to this embodiment, the host management program 6110c may include the same interface as the user interface of the integrated management program 7110 illustrated in FIG. 23 and FIG. 24. Moreover, the host management program 6110c may carry out the host I/O path equalizing processing by the integrated management program 7110 illustrated in FIG. 25 and FIG. 26.

The data processing according to the third embodiment has been described. By those pieces of processing, when the storage management computer 4000 is carrying out or will carry out, in the future, the operation of the setting change directed to the storage apparatus 1000, the host management computer 6000 can identify changes that occur in the information on the host computer 2000 by the operation of the setting change.

Therefore, the host management computer 6000 can carry out the management operations (such as the display of the configuration information and the processing of equalizing the host I/O paths) by using the information on the host computer 2000 at the current time point as well as the information at the future time point.

As a result, the administrator using the host management computer 6000 can manage the host computer 2000 in consideration of the changes that occur in the future.

The variety of software exemplified in the embodiments can be stored in various media (for example, non-transitory storage media), such as electro-magnetic media, electronic media, and optical media and can be downloaded to a computer through communication network such as the Internet.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

What is claimed is:

1. A computer system, comprising:
   at least one storage apparatus comprising:
      at least one physical resource; and
      at least one storage volume constructed by the at least one physical resource;
   at least one host computer comprising at least one storage volume assigned from the at least one storage apparatus; and
   a management computer configured to manage the at least one storage apparatus and the at least one host computer,
   the management computer comprising:
      a first management computer configured to acquire storage configuration information including configuration information from the storage apparatus, to thereby manage the storage apparatus;
      a second management computer configured to acquire host configuration information including configuration information from the host computer, to thereby manage the host computer; and
      a third management computer configured to acquire the storage configuration information and the host configuration information respectively from the first management computer and the second management computer, to thereby manage the storage apparatus and the host computer,
   the third management computer including:
      first template information for identifying a change that occurs in the host configuration information acquired from the second management computer when the first management computer carries out a management operation accompanying a configuration change for the storage apparatus: and
      management subject resource relationship information representing a correspondence between the storage configuration information held by the first management computer and the host configuration information held by the second management computer,
   the first management computer being configured to notify, before the management operation accompanying the configuration change is carried out for the storage apparatus, the third management computer of a change that occurs in the storage configuration information as an execution result of the management operation,
   the third management computer being configured to identify a change that occurs in the host configuration information based on the change that occurs in the storage configuration information notified by the first management computer, the first template information, and the management subject resource relationship information representing the correspondence between the storage configuration information and the host configuration information.

2. The computer system according to claim 1,
   wherein the first management computer includes second template information for identifying a change that occurs in the storage configuration information when the first management computer carries out the management operation accompanying the configuration change for the storage apparatus, and
   wherein the first management computer is configured to notify, before the management operation accompanying the configuration change is carried out for the storage apparatus, the third management computer of a type, a parameter, and execution date and time of the management operation, and the change that occurs in the storage configuration information as an execution result of the management operation.

3. The computer system according to claim 1, wherein the computer system is configured to output the change that occurs in the host configuration information identified by the third management computer and date and time at which the change is scheduled to occur.

4. The computer system according to claim 1, wherein the computer system is configured to generate, based on the change that occurs in the host configuration information identified by the third management computer, future information at a specified time point or in a specified time range including one of the storage configuration information and the host configuration information after the occurrence of the change, and carry out, based on the future information, the management operation accompanying the configuration change for one of the storage apparatus and the host computer.

5. The computer system according to claim 1, wherein the computer system is configured to identify, based on the change that occurs in the host configuration information identified by the third management computer, out of the storage configuration information and the host configuration information, information whose state is determined at one of a specified future time point and a specified future time range, and carry out, based on the information whose state is determined at the one of the specified future time point and the specified future time range, the management operation accompanying the configuration change for one of the storage apparatus and the host computer.

6. The computer system according to claim 1, wherein the computer system is configured to identify, based on the change that occurs in the host configuration information identified by the third management computer, out of the storage configuration information and the host configuration information after the occurrence of the change, information in which the change occurs at one of a specified future time point and a specified future time range, and carry out, when a number of pieces of the information in which the change occurs is equal to or less than a predetermined threshold, the management operation accompanying the configuration change for the storage apparatus and the host computer.

7. The computer system according to claim 1,
wherein the first management computer is configured to notify, before the management operation accompanying the configuration change is carried out for the storage apparatus, the third management computer of a type, a parameter, and execution date and time of the management operation, and the change that occurs in the storage configuration information as an execution result of the management operation respectively for successful and failed cases of the management operation, and
wherein the third management computer is configured to identify, based on the change that occurs in the storage configuration information notified by the first management computer, the first template information, and the management subject resource relationship information representing the correspondence between the storage configuration information and the host configuration information, the change that occurs in the host configuration information acquired from the second management computer respectively for the successful and failed cases of the management operation.

8. A computer system, comprising:
at least one storage apparatus comprising:
at least one physical resource; and
at least one storage volume constructed by the at least one physical resource;
at least one host computer comprising at least one storage volume assigned from the at least one storage apparatus; and
a management computer configured to manage the at least one storage apparatus and the at least one host computer,
the management computer comprising:
a first management computer configured to acquire storage configuration information including configuration information from the storage apparatus, to thereby manage the storage apparatus; and
a second management computer configured to acquire host configuration information including configuration information from the host computer, to thereby manage the host computer,
the second management computer including:
first template information for identifying a change that occurs in the host configuration information when the first management computer carries out a management operation accompanying a configuration change for the storage apparatus; and
management subject resource relationship information representing a correspondence between the storage configuration information held by the first management computer and the host configuration information,
the first management computer being configured to notify, before the management operation accompanying the configuration change is carried out for the storage apparatus, the second management computer of a change that occurs in the storage configuration information as an execution result of the management operation,
the second management computer being configured to identify the change that occurs in the host configuration information based on the change that occurs in the storage configuration information notified by the first management computer, the first template information, and the management subject resource relationship information representing the correspondence between the storage configuration information and the host configuration information.

9. The computer system according to claim 8,
wherein the first management computer includes second template information for identifying a change that occurs in the storage configuration information when the first management computer carries out the management operation accompanying the configuration change for the storage apparatus, and
wherein the first management computer is configured to notify, before the management operation accompanying the configuration change is carried out for the storage apparatus, the second management computer of a type, a parameter, and execution date and time of the management operation, and the change that occurs in the storage configuration information as an execution result of the management operation.

10. The computer system according to claim 8, wherein the change that occurs in the host configuration information identified by the second management computer and a date and time at which the change is scheduled to occur are output.

11. The computer system according to claim 8, wherein the computer system is configured to generate, based on the change that occurs in the host configuration information identified by the second management computer, future information at a specified time point or in a specified time range including one of the storage configuration information and the host configuration information after the change occurs, and carry out, based on the future information, the management operation accompanying the configuration change for one of the storage apparatus and the host computer.

12. The computer system according to claim 8, wherein the computer system is configured to identify, based on the change that occurs in the host configuration information identified by the second management computer, out of the storage configuration information and the host configuration information, information whose state is determined at one of a specified future time point and a specified future time range, and carry out, based on the information whose state is determined at the one of the specified future time point and the specified future time range, the management operation accompanying the configuration change for one of the storage apparatus and the host computer.

13. The computer system according to claim 8, wherein the computer system is configured to identify, based on the change that occurs in the host configuration information identified by the second management computer, out of the storage configuration information and the host configuration information after the occurrence of the change, information in which the change occurs at one of a specified future time point and a specified future time range, and carry out, when a number of pieces of the information in which the change occurs is equal to or less than a predetermined threshold, the management operation accompanying the configuration change for the storage apparatus and the host computer.

14. The computer system according to claim 8,
wherein the first management computer is configured to notify, before the management operation accompanying the configuration change is carried out for the storage apparatus, the second management computer of a type, a parameter, and execution date and time of the management operation, and the change that occurs in the storage configuration information as an execution result of the management operation respectively for successful and failed cases of the management operation, and
wherein the second management computer is configured to identify, based on the change that occurs in the storage configuration information notified by the first management computer, the first template information, and the management subject resource relationship information representing the correspondence between the storage configuration information and the host configuration information, the change that occurs in the host configuration information respectively for the successful and failed cases of the management operation.

15. A management method for a computer system,
the computer system comprising: at least one storage apparatus comprising at least one physical resource, and at least one storage volume constructed by the at least one physical resource; at least one host computer comprising at least one storage volume assigned from the at least one storage apparatus; and a management computer comprising a processor and a memory and configured to manage the at least one storage apparatus and the at least one host computer,
the management computer comprising:
a first management computer configured to acquire storage configuration information including configuration information from the storage apparatus, to thereby manage the storage apparatus;
a second management computer configured to acquire host configuration information including configuration information from the host computer, to thereby manage the host computer; and
a third management computer configured to acquire the storage configuration information and the host configuration information respectively from the first management computer and the second management computer, to thereby manage the storage apparatus and the host computer,
the management method comprising:
a first step of acquiring, by the third management computer, the storage configuration information held by the first management computer;
a second step of acquiring, by the third management computer, the host configuration information held by the second management computer;
a third step of notifying, by the first management computer, before a management operation accompanying a configuration change is carried out for the storage apparatus, the third management computer of a change that occurs in the storage configuration information as an execution result of the management operation; and
a fourth step of identifying, by the third management computer, a change that occurs in the host configuration information acquired from the second management computer based on the change that occurs in the storage configuration information notified by the first management computer, first template information for identifying the change that occurs in the host configuration information acquired from the second management computer when the first management computer carries out the management operation accompanying the configuration change for the storage apparatus, and management subject resource relationship information representing a correspondence between the storage configuration information and the host configuration information.

\* \* \* \* \*